US006282067B1

(12) United States Patent
Machida et al.

(10) Patent No.: US 6,282,067 B1
(45) Date of Patent: Aug. 28, 2001

(54) MAGNETIC REPRODUCING HEAD HAVING A MAGNETORESISTIVE EFFECT

(75) Inventors: Kenji Machida; Naoto Hayashi; Yoshiro Yoneda; Junji Numazawa, all of Tokyo; Makiko Kohro, Saitama; Takahisa Tanabe, Saitama; Shinichi Nagahara, Saitama, all of (JP)

(73) Assignees: Nippon Hoso Kyokai, Tokyo (JP); Pioneer Corporation, Tokyo (JP)

( * ) Notice: Subject to any disclaimer, the term of this patent is extended or adjusted under 35 U.S.C. 154(b) by 0 days.

(21) Appl. No.: 09/399,747

(22) Filed: Sep. 20, 1999

(30) Foreign Application Priority Data

Sep. 18, 1998 (JP) .................................. 10-265355

(51) Int. Cl.[7] ..................................................... G11B 5/39
(52) U.S. Cl. ......................................... 360/316; 360/327.1
(58) Field of Search ..................................... 360/313, 316, 360/324, 324.1, 324.12, 327, 327.1, 327.11, 327.22–327.33

(56) References Cited

U.S. PATENT DOCUMENTS

| 4,356,523 | * | 10/1982 | Yeh ........................................ 360/113 |
| 5,065,094 | * | 11/1991 | Mowry ............................. 324/207.21 |
| 5,402,292 | * | 3/1995 | Komoda et al. ....................... 360/113 |
| 5,412,524 | * | 5/1995 | Nagata et al. ......................... 360/113 |
| 5,592,082 | * | 1/1997 | Kuriyama ............................... 324/252 |
| 5,734,532 | * | 3/1998 | Kobayashi et al. .................... 360/113 |
| 5,737,156 | * | 4/1998 | Bonyhard .............................. 360/113 |
| 5,946,169 | * | 8/1999 | O'Kane et al. ........................ 360/113 |

FOREIGN PATENT DOCUMENTS

| 0 551 603 A1 | * | 7/1993 | (EP) . |
| 0 738 896 A2 | * | 10/1996 | (EP) . |
| 57-208624 | * | 12/1982 | (JP) . |
| 58-100216 | * | 6/1983 | (JP) . |
| 58-100217 | * | 6/1983 | (JP) . |
| 60-119618 | * | 6/1985 | (JP) . |
| 5-054338 | * | 3/1993 | (JP) . |
| 6-036239 | * | 2/1994 | (JP) . |
| 6-236520 | * | 8/1994 | (JP) . |
| 7-296335 | * | 11/1995 | (JP) . |

OTHER PUBLICATIONS

IBM TDB "Magnetically Coupled Barberpole MR Head With Built In Longitudinal Bias Structure and Process."Jul. 1977, vol. 20, issue No. 2, pp. 791–793.*

* cited by examiner

Primary Examiner—William Klimowicz
(74) Attorney, Agent, or Firm—Sughrue, Mion, Zinn, Macpeak & Seas, PLLC

(57) ABSTRACT

A magnetoresistive effect element 5 is physically configured such that the element width is at least three times as large as the element height. A plurality of domain control layers 11 to 13 are located between the magnetoresistive effect element 5 and a plurality of detecting electrodes 8 to 10 in a state that the domain control layers 11 to 13 are closely formed on the magnetoresistive effect element 5. Each of the domain control layers 11 to 13 applies a unidirectional magnetic field to a region of the magnetoresistive effect element 5 vertically disposed in a guard band of the magnetic recording medium 4, the guard band having no information recorded therein. The unidirectional magnetic field is directed in an orientation of an initial magnetization in a single magnetoresistive effect element, the orientation of which depends on a direction of on an easy axis of the magnetoresistive effect element 5.

8 Claims, 15 Drawing Sheets

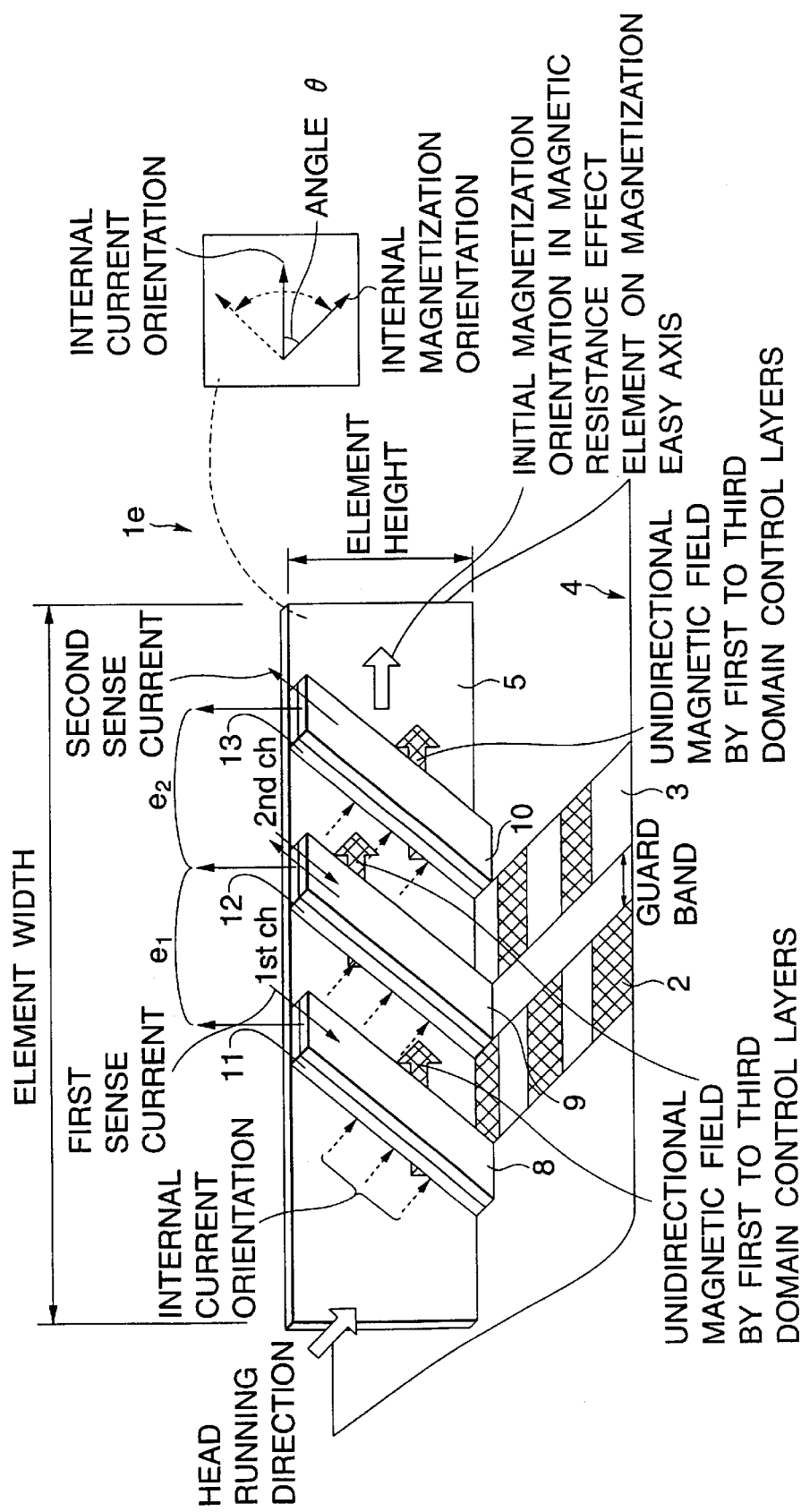

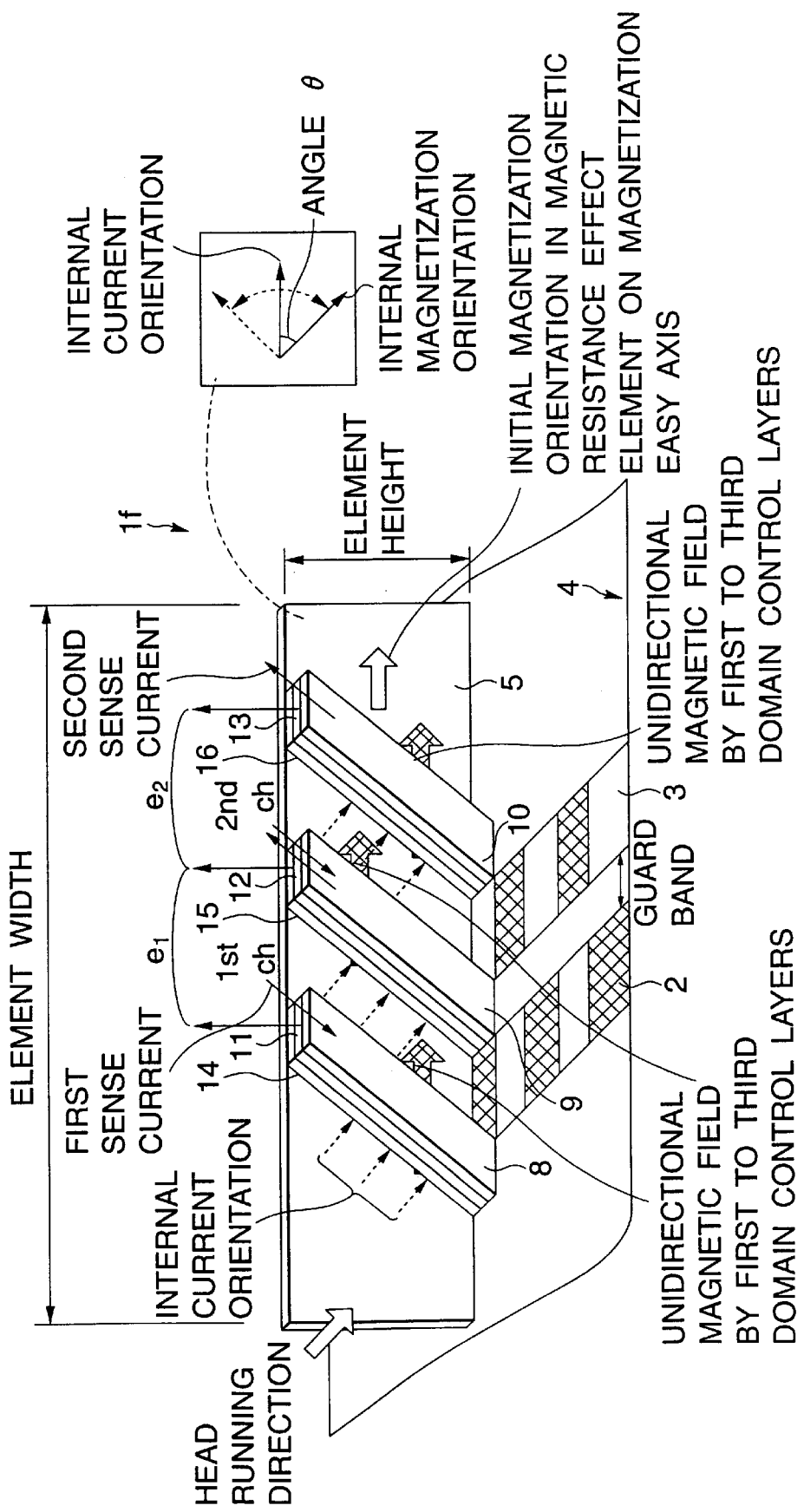

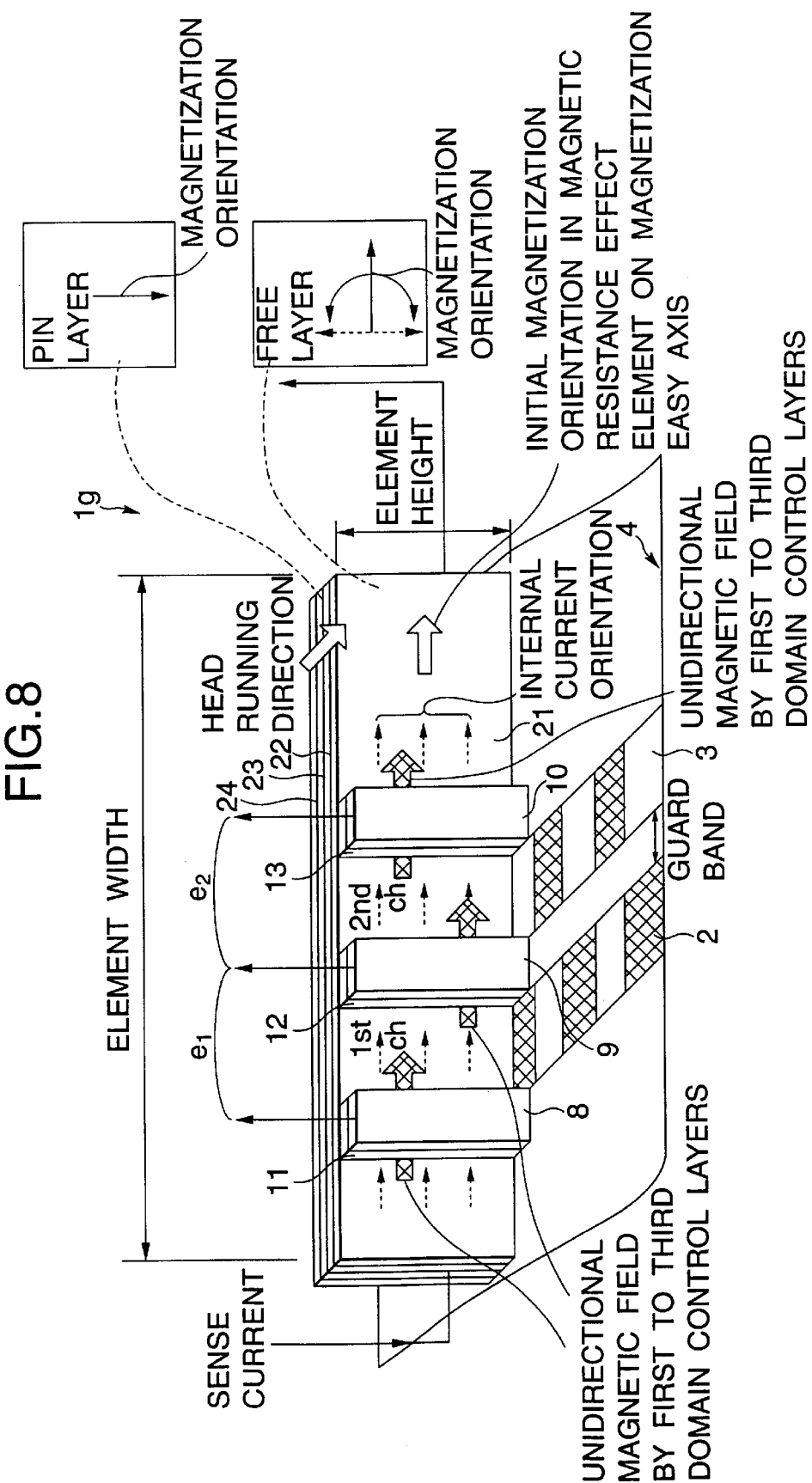

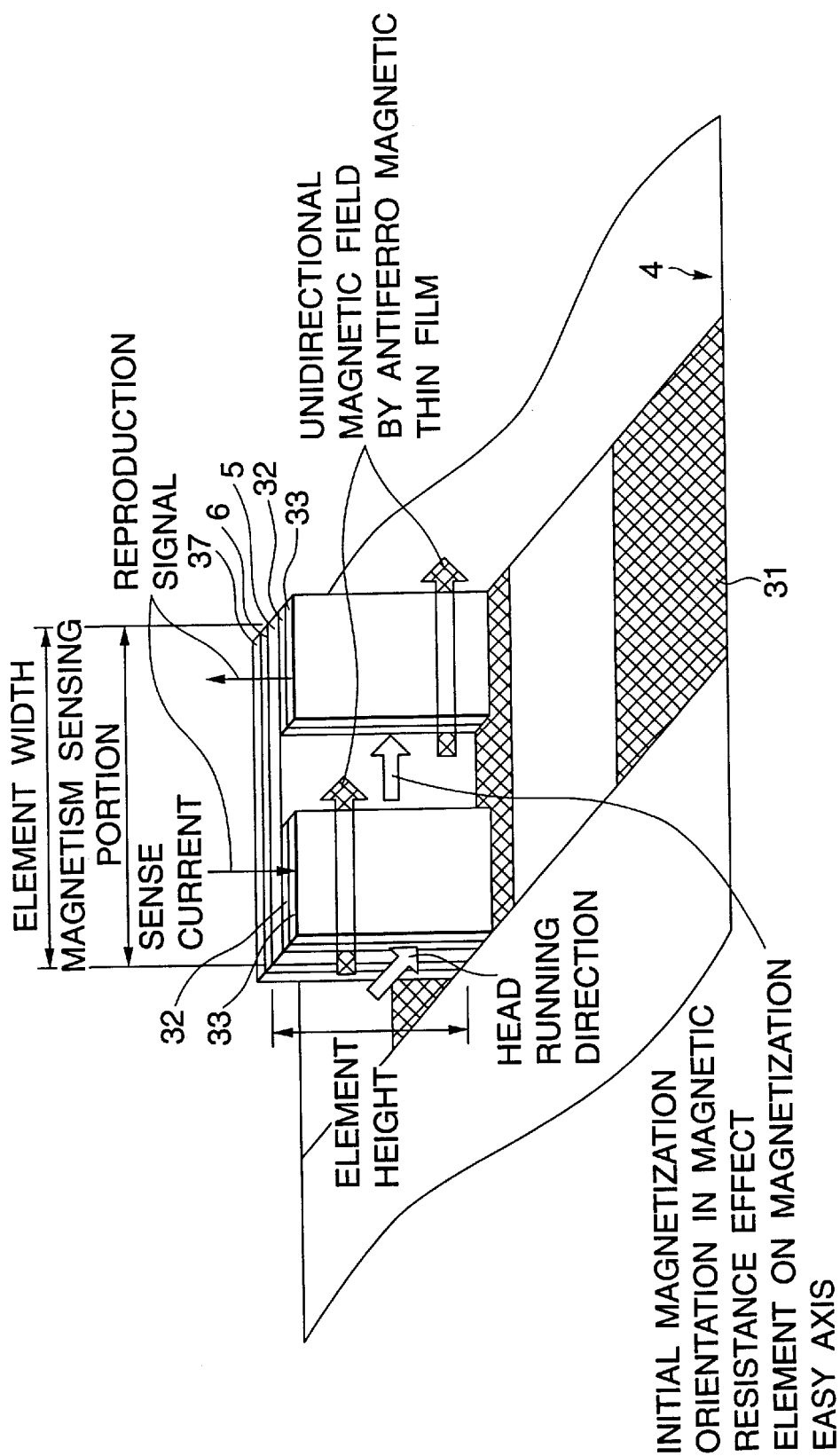

MAGNETIC REPRODUCING HEAD HAVING A MAGNETORESISTIVE EFFECT

BACKGROUND OF THE INVENTION

1. Field of the Invention

The present invention relates to a magnetic reproducing head in use with computers, video/audio/data tape recorders, and disc devices. Particularly, the invention relates to a magnetic reproducing head in which signal detecting portions of which the number is equal to "the number of recorded tracks to be subjected to concurrent reproduction process+1" are disposed on a single magnetoresistive effect element, whereby the head structure is simplified, and plural pieces of information are separately and concurrently reproduced from a plurality of recorded tracks.

More particularly, the invention relates to a multi-channel magnetic-resistance-effect (MRE) thin-film magnetic head for high track density reproduction, in which the magnetic head includes domain control layers bonded onto one of the larger surfaces of a single magnetoresistive effect element, and detecting electrodes being in close contact with the surfaces of the domain control layers, while being disposed in opposition to the magnetoresistive effect element with respect to the domain control layers. The domain control layers are vertically disposed on a region of a magnetic recording medium, the region being located between adjacent recorded tracks on the magnetic recording medium. The number of the domain control layers is equal to "the number of recorded tracks±1". The width of each domain control layer is shorter than the width of a space between adjacent recorded tracks on the magnetic recording medium. With such a unique technical feature, plural pieces of information are concurrently reproduced from the recorded tracks in the form of potential differences each between adjacent detecting electrodes. The unique technical feature accrues to the following advantageous results. A reproduced crosstalk for a recorded track, which leaks from a recorded track or tracks adjacent to the recorded track (this or those adjacent tracks will be referred to simply as an "adjacent track"), is satisfactorily suppressed. Reproduced noises are little generated. A reproduced signal that is output from the resultant magnetic head is high in level.

2. Description of the Related Art

Attempt has been made to realize a multi-channel MRE thin-film magnetic head for high track density reproduction which is capable of concurrently reproducing information from a plurality of recorded tracks even where the track pitch (= the distance between two adjacent recorded tracks) is narrow. Such a magnetic head is disclosed as a magnetic reproducing head in Japanese Patent Unexamined Publication No. Hei 8-263812, and shown in FIG. 12.

The magnetic reproducing head disclosed in the publication is a multi-channel MRE thin-film magnetic head for high track density reproduction capable of concurrently reproducing information from a plurality of recorded tracks on a magnetic recording medium, such as a magnetic tape or a magnetic disc. The magnetic reproducing head includes a magnetoresistive effect element which is disposed crossing at least two recorded tracks on a magnetic recording medium, which the recorded tracks are to be subjected to concurrent reproducing process, and further detecting electrodes of which the number is equal to "the number of reproduced recorded tracks+1". The magnetoresistive effect element allows a flow of an internal current in a direction which depends on a sense current fed thereto, and has an easy axis of magnetization longitudinally oriented. The detecting electrodes are bonded on one of the large surfaces of the magnetoresistive effect element while vertically disposed between the recorded tracks. The multi-channel MRE thin-film magnetic head detects potential differences each between two adjacent detecting electrodes, and produces those in the form of reproduced signals.

The operation of the magnetic reproducing head thus constructed will described with reference to FIG. 12. A bias magnetic field is applied from a bias magnetic thin film 27 to a magnetoresistive effect element 5, while at the same time a sense current is fed to the same, whereby an initial state is set up in the magnetoresistive effect element. The bias magnetic field is directed upward or downward when viewed in the height directions of the magnetoresistive effect element (downward in FIG. 12). With the application of the bias magnetic field, an angle θ developed between 1) an orientation of an internal magnetization of the magnetoresistive effect element 5, which is located in a region of a first channel (1st CH) defined between a first detecting electrode 8 and a second detecting electrode 9, and 2) an orientation of an internal current flowing through the magnetoresistive effect element 5, satisfies $10°≦θ80°$ or $100°≦θ170°$. In the specification, θ=450.

The orientation of the internal magnetization of the magnetoresistive effect element 5 located in the 1 st CH region is rotated so that an angle α between its orientation and the orientation of the internal current satisfies a relation $0°≦α≦90°$, in accordance with a magnitude of leaking flux by a signal (illustrated as a series of meshes and white stripes in FIG. 12) recorded in the first recorded track 2 on a magnetic recording medium 4. As a result, resistance of the magnetoresistive effect element 5 located in the 1st channel region varies (FIG. 12), and a reproduction voltage varies from B1 (low resistance state)—K1 (initial state)—A1 (high resistance state) in accordance with the recording signal of a first recorded track 2, to thereby form a first reproduced signal e1 (FIG. 13A).

Similarly, the angle, which is developed between an orientation of an internal magnetization of the magnetoresistive effect element 5, which is located in a region of a second channel (2nd CH) defined between the second detecting electrode 9 and a third detecting electrode 10, and an orientation of an internal current flowing through the magnetoresistive effect element 5, is θ in the initial state of the magnetic reproducing head.

The orientation of the internal magnetization of the magnetoresistive effect element 5 located in the 2nd CH region is rotated so that an angle α between its orientation and the orientation of the internal current satisfies a relation $0°≦α≦90°$, in accordance with a magnitude of leaking flux by a signal (illustrated also as a series of meshes and white stripes) recorded in the second recorded track 3 on the magnetic recording medium 4. As a result, resistance of the magnetoresistive effect element 5 located in the 2nd channel region varies, and a reproduction voltage varies from A2 (high resistance state)—K2 (initial state)—B2 (low resistance state) in accordance with the recording signal of a second recorded track 3, to thereby form a second reproduced signal e2 (FIG. 13B).

In such a simple multi-channel MRE thin-film magnetic head, improper magnetic domains are generated in a ferromagnetic material (mainly Ni-Fe) used for the magnetoresistive effect element, and the Bloch or domain walls shift in the reproducing operation, thereby causing called Barkhausen noises to generate. To cope with this, a MRE thin-film magnetic head for one-track reproduction is disclosed in U.S. Pat. No. 4,103,315. In the magnetic head, as shown in FIG. 14, an external magnetic field of which the orientation is coincident with an orientation of an initial magnetization in the single magnetoresistive effect element on the easy axis of magnetization of the magnetoresistive effect element, is applied to a magnetoresistive effect element. As a result, a single magnetic domain is formed in the magnetoresistive effect element.

In the magnetic head, antiferromagnetic thin films 32, as shown in FIG. 14, are partially layered on both ends of a portion for sensing an external magnetic field (referred to as a magnetism sensing portion) of a magnetoresistive effect element 5. A magnetic field directed in an orientation of an initial magnetization in the single magnetoresistive effect element on the easy axis of magnetization of the magnetoresistive effect element 5, which is caused by exchange bond at the interface between the magnetoresistive effect element 5 and each antiferromagnetic thin film 32, is applied to the magnetism sensing portion.

A technique for improving the sensitivity of the magnetic head of the US patent is developed and disclosed in AP-A-3125311. A MRE thin film magnetic head of the Japanese publication uses a domain control for improving the sensitivity of the magnetic head, and a magnetoresistive effect element 5 is formed on only the magnetism sensing portion (FIG. 15). Hard magnetic thin films 34 are formed outside the magnetism sensing portion. A unidirectional magnetic field is applied to the magnetoresistive effect element 5. The unidirectional magnetic field is generated by magnetizing the hard magnetic thin films 34 so as to have an orientation of magnetization being coincident with the orientation of the initial magnetization in a single magnetoresistive effect element on the easy axis of magnetization of the magnetoresistive effect element 5.

In the magnetic reproducing head described in JA-A-8-263812, the following problem arises when the track pitch becomes short. A reproduction output signal detected in the region of the magnetoresistive effect element 5 vertically disposed on the guard band (FIG. 12) on the magnetic recording medium 4, which the guard band is located between two adjacent recorded tracks and has no information recorded therein, increases relative to a reproduced signal in the region of the magnetoresistive effect element 5 vertically disposed on each recorded track. In this state, a reproduction cross talk leaking from an adjacent track increases, and as a result, a signal to noise (S/N) ratio is deteriorated.

In the magnetic reproducing head of the above Japanese publication, it is expected that, by using a single magnetoresistive effect element 5, a single magnetic domain is set up in the magnetoresistive effect element 5 by increasing a crystal magnetic anisotropy of the magnetoresistive effect element 5 in a manner that the width (element width) of the magnetoresistive effect element 5 is set to be sufficiently larger than the height of the magnetoresistive effect element 5. However, such a setting of the width to height ratio is insufficient to form a single magnetic domain in the magnetoresistive effect element 5. Actually, improper magnetic domains are formed or irregular magnetization occurs in the magnetoresistive effect element 5. As a result, Barkhausen noise is generated, and the reproduced signals of the recorded tracks are not uniform.

Also, in the magnetic reproducing head described in U.S. Pat. No. 4,103,315, when the track width is reduced with increase of a recording density, a ratio of the width (element width) to the height (element height) of the magnetoresistive effect element 5 becomes small, and a crystal magnetic anisotropy of the magnetoresistive effect element 5 becomes small (for the element width and the element height, reference is made to FIG. 14). For this reason, an effective domain control of the magnetoresistive effect element 5 is impossible, resulting in generation of Barkhausen noise. In this respect, this magnetic head is not suitable for high track density reproduction.

Also, in the magnetic head disclosed in Japanese Patent Unexamined Publication No. 3-125311, when the track width is gradually reduced with increase of a recording density, a ratio of the width (element width) of the magnetoresistive effect element 5 to its height (element height) gradually decreases (for the element width and height, reference is made to FIG. 15), and a crystal magnetic anisotropy of the magnetoresistive effect element 5 becomes small. For this reason, a large hard magnetic thin film capable of generating a larger unidirectional magnetic field is required for effecting an efficient domain control of the magnetoresistive effect element 5. This makes it difficult to reduce the size of the magnetic head for the high track density reproduction purpose.

SUMMARY OF THE INVENTION

Accordingly, an object of the present invention is to provide a magnetic reproducing head improved such that even when the recorded track pitch is narrow, the head is capable of remarkably reducing the reproduction crosstalk leaking from an adjacent recorded track, and efficiently controlling the magnetic domain of a magnetoresistive effect element by applying, a magnetic field to a region of the magnetoresistive effect element, thereby to remarkably reduce Barkhausen noises and to output a high reproduced signal.

To achieve the above object, according to a first aspect of the present invention, there is provided a magnetic reproducing head having 1) a magnetoresistive effect element which is disposed crossing at least two recorded tracks on a magnetic recording medium, which the recorded tracks are to be subjected to concurrent reproduction process, the magnetoresistive effect element allowing a flow of an internal current in a direction which depends on a sense current fed thereto, and having easy axis of magnetization longitudinally oriented, and further 2) detecting electrodes of which the number is equal to "the number of reproduced recorded tracks+1", the detecting electrodes being bonded on one of the large surfaces of the magnetoresistive effect element while vertically disposed between the recorded tracks, the magnetic reproducing head being characterized in that the magnetic reproducing head comprises domain control layers of which the number is equal to that of the detecting electrodes, the domain control layers being closely formed between the magnetoresistive effect element and the detecting electrodes, and having an element width at least three times as large as the element height but is shorter than the width of a portion having no information recorded therein and being located between the recorded tracks, the domain control layers capable of generating a unidirectional magnetic field directed in an orientation of an initial magnetization in a single magnetoresistive effect element on an easy axis of the magnetoresistive effect element.

According to a second aspect of the invention, there is provided a magnetic reproducing head as defined in the first aspect of the invention, in which each domain control layer is an antiferromagnetic thin film or a hard magnetic thin film having an orientation of magnetization at the interface between the thin film and the magnetoresistive effect element, which is coincident with an orientation of an initial magnetization of a single magnetoresistive effect element on an easy axis of the magnetoresistive effect element.

According to a third aspect of the invention, there is provided a magnetic reproducing head as defined in the first aspect of the invention, in which each domain control layer is a hard magnetic thin film having an orientation of magnetization displaced 180° from an orientation of an initial magnetization of a single magnetoresistive effect element on an easy axis of the magnetoresistive effect element, and a nonmagnetic conductive layer is formed between the magnetoresistive effect element and the hard magnetic thin film.

According to a fourth aspect of the invention, there is provided a magnetic reproducing head as defined in any of the first to third aspects of the invention, in which a bias nonmagnetic conductive film is closely formed on the other side of the magnetoresistive effect element, the bias nonmagnetic conductive film developing a bias magnetic field directed upward or downward in the element height by flowing part of a sense current into the magnetoresistive effect element in its longitudinal direction so that an angle developed between an orientation of an internal magnetization and an orientation of an internal current of the magnetoresistive effect element is set at a given angle between a range of 10° to 80° or a range of 100° to 170°.

According to a fifth aspect of the invention, there is provided a magnetic reproducing head as claimed in any of the first to third aspects of the invention, in which a nonmagnetic spacer layer is closely formed on the other side of the magnetoresistive effect element, and a bias nonmagnetic conductive film is closely formed on the nonmagnetic spacer layer while being disposed in opposition to the magnetoresistive effect element with respect to the nonmagnetic spacer layer, the bias nonmagnetic conductive film developing a bias magnetic field so that an angle developed between an orientation of an internal magnetization and an orientation of an internal current of the magnetoresistive effect element is set at a given angle between a range of 10° to 80° or a range of 100° to 170°.

According to a sixth aspect of the invention, there is provided a magnetic reproducing head as defined in the fifth aspect of the invention, in which the bias thin film is any of a soft magnetic thin film or a hard magnetic thin film magnetized in an upward or downward direction when viewed in the height of the magnetoresistive effect element, and a nonmagnetic conductive film for developing a bias magnetic field directed upward or downward in the height of the magnetoresistive effect element by flowing a current in its longitudinal direction.

According to a seventh aspect of the invention, there is provided a magnetic reproducing head as defined in any of the first to third aspects of the invention, in which the domain control layers bonded on the magnetoresistive effect element and the detecting electrodes bonded on the surfaces of the domain control layers opposed to the magnetoresistive effect element are slanted at predetermined angle on the bonding surfaces so that an angle developed between an orientation of an internal magnetization and an orientation of an internal current of the magnetoresistive effect element is set at a given angle between a range of 10° to 80° or a range of 100° to 170°.

According to an eighth aspect of the invention, there is provided a magnetic reproducing head as defined in any of the first to third aspects of the invention, in which the magnetoresistive effect element is a spin valve magnetoresistive effect element consisting of a lamination of an antiferromagnetic thin film, a first ferromagnetic thin film, and a second ferromagnetic thin film are layered while nonmagnetic conductive layer interposed therebetween, a magnetization of the first ferromagnetic thin film is fixedly oriented upward or downward in the height of the magnetoresistive effect element by the antiferromagnetic thin film, an orientation of magnetization of the second ferromagnetic thin film of which an initial magnetization is set in the element widthwise direction is rotated in accordance with a magnitude of a leaking flux from the magnetic recording medium, and its resistance variation of it, which depends on a quantity of magnetization rotation, is converted into a voltage variation, and the voltage variation is output as an output signal from the magnetic recording medium.

In the magnetic reproducing head according to the first aspect of the present invention, a plurality of domain control layers, each of which is shorter than the width of a portion having no information recorded therein and is located between the recorded tracks, and is closely formed between the magnetoresistive effect element and the detecting electrodes, are capable of generating a unidirectional magnetic field directed in an orientation of an initial magnetization in a single magnetoresistive effect element on an easy axis of the magnetoresistive effect element. The first magnetic reproducing head produces the following useful effects. A reproduction crosstalk from an adjacent recorded track is considerably reduced even when the track pitch is narrow. The domain control of the magnetoresistive effect element is efficiently carried out. Barkhausen noise is remarkably reduced.

In the magnetic reproducing head according to the second aspect of the invention, each domain control layer is an antimagnetic thin film or a hard magnetic thin film having an orientation of magnetization at the interface between the thin film and the magnetoresistive effect element, which is coincident with an orientation of an initial magnetization of a single magnetoresistive effect element on an easy axis of the magnetoresistive effect element. With this, a unidirectional magnetic field directed in an orientation of an initial magnetization of a single magnetoresistive element on an easy axis of the magnetoresistive effect element is applied to a region of the magnetoresistive effect element by exchange bond at the interface between the magnetoresistive effect element and the domain control layer. The advantageous results are to considerably reduce the reproduction crosstalk from an adjacent recording medium, to efficiently control the magnetic domain of the magnetoresistive effect element, and to considerably reduce Barkhausen noises.

In the magnetic reproducing head according to the third aspect of the invention, each domain control layer is a hard magnetic thin film having an orientation of magnetization displaced 180° from an orientation of an initial magnetization of a single magnetoresistive effect element on an easy axis of the magnetoresistive effect element, and a nonmagnetic conductive layer is formed between the magnetoresistive effect element and the hard magnetic thin film. With this, conduction between each detecting electrode and the magnetoresistive effect element is secured, exchange interactive action between the magnetoresistive effect elements is prevented, a unidirectional magnetic field directed in an orientation of an initial magnetization of a single magnetoresistive element on an easy axis of the magnetoresistive effect element is applied to a region of the magnetoresistive effect element by a leaking magnetic field of the domain control layer. The results are to considerably reduce the reproduction crosstalk from an adjacent recording track, to efficiently control the magnetic domain of the magnetoresistive effect element, and to considerably reduce Barkhausen noises.

In the magnetic reproducing head according to the fourth aspect of the invention, a bias nonmagnetic conductive film is closely formed on the other side of the magnetoresistive effect element, the bias nonmagnetic conductive film developing a bias magnetic field directed upward or downward in the element height by flowing part of a sense current into the magnetoresistive effect element in its longitudinal direction so that an angle developed between an orientation of an internal magnetization and an orientation of an internal current of the magnetoresistive effect element is set at a given angle between a range of 10° to 80° or a range of 100° to 170°. With this technical feature, an amplitude of a reproduced signal detected by a detecting electrode can be increased. A high reproduced signal is output even when the track pitch is narrow.

In the magnetic reproducing head according to the fifth aspect of the invention, a nonmagnetic spacer layer is closely formed on the other side of the magnetoresistive effect element, and a bias nonmagnetic conductive film is closely formed on the nonmagnetic spacer layer while being disposed in opposition to the magnetoresistive effect element with respect to the nonmagnetic spacer layer, the bias nonmagnetic conductive film developing a bias magnetic field so that an angle developed between an orientation of an internal magnetization and an orientation of an internal current of the magnetoresistive effect element is set at a given angle between a range of 10° to 80° or a range of 100° to 170°. With this technical feature, an amplitude of a reproduced signal detected by a detecting electrode can be increased. A high reproduced signal is output even when the track pitch is narrow.

In the magnetic reproducing head according to the seventh aspect of the invention, the domain control layers bonded on the magnetoresistive effect element and the detecting electrodes bonded on the surfaces of the domain control layers opposed to the magnetoresistive effect element are slanted at predetermined angle on the bonding surfaces so that an angle developed between an orientation of an internal magnetization and an orientation of an internal current of the magnetoresistive effect element is set at a given angle between a range of 10° to 80° or a range of 100° to 170°. Therefore, the effect yielded by the bias magnetic thin film is equivalently produced not using the bias magnetic thin film.

In the eighth magnetic reproducing head according to the eighth aspect of the invention the magnetoresistive effect element is a spin valve magnetoresistive effect element consisting of a lamination of an antiferromagnetic thin film, a first ferromagnetic thin film, and a second ferromagnetic thin film are layered while nonmagnetic conductive layer 22 interposed therebetween, a magnetization of the first ferromagnetic thin film is fixedly oriented upward or downward in the height of the magnetoresistive effect element by the antiferromagnetic thin film, an orientation of magnetization of the second ferromagnetic thin film of which an initial magnetization is set in the element widthwise direction is rotated in accordance with a magnitude of a leaking flux from the magnetic recording medium, and its resistance variation of it, which depends on a quantity of magnetization rotation, is converted into a voltage variation, and the voltage variation is output as an output signal from the magnetic recording medium. Because of this, an amplitude of the reproduced signal detected by the detecting electrode can be increased. Therefore, a high reproduced signal is output even when the track pitch is narrow.

BRIEF DESCRIPTION OF THE DRAWINGS

FIG. 5 is a diagram showing an arrangement of a magnetic reproducing head which is a fifth embodiment of the present invention;

FIG. 7 is a diagram showing an arrangement of a magnetic reproducing head which is a sixth embodiment of the present invention;

FIG. 8 is a diagram showing an arrangement of a magnetic reproducing head which is a seventh embodiment of the present invention;

FIG. 14 is a diagram showing an arrangement of a conventional MRE thin film magnetic head for a single track reproduction.

DETAILED DESCRIPTION OF THE PREFERRED EMBODIMENTS

Preferred embodiments of magnetic reproducing heads according to the present invention will be described with reference to the accompanying drawings.

First Embodiment

Figure 1:
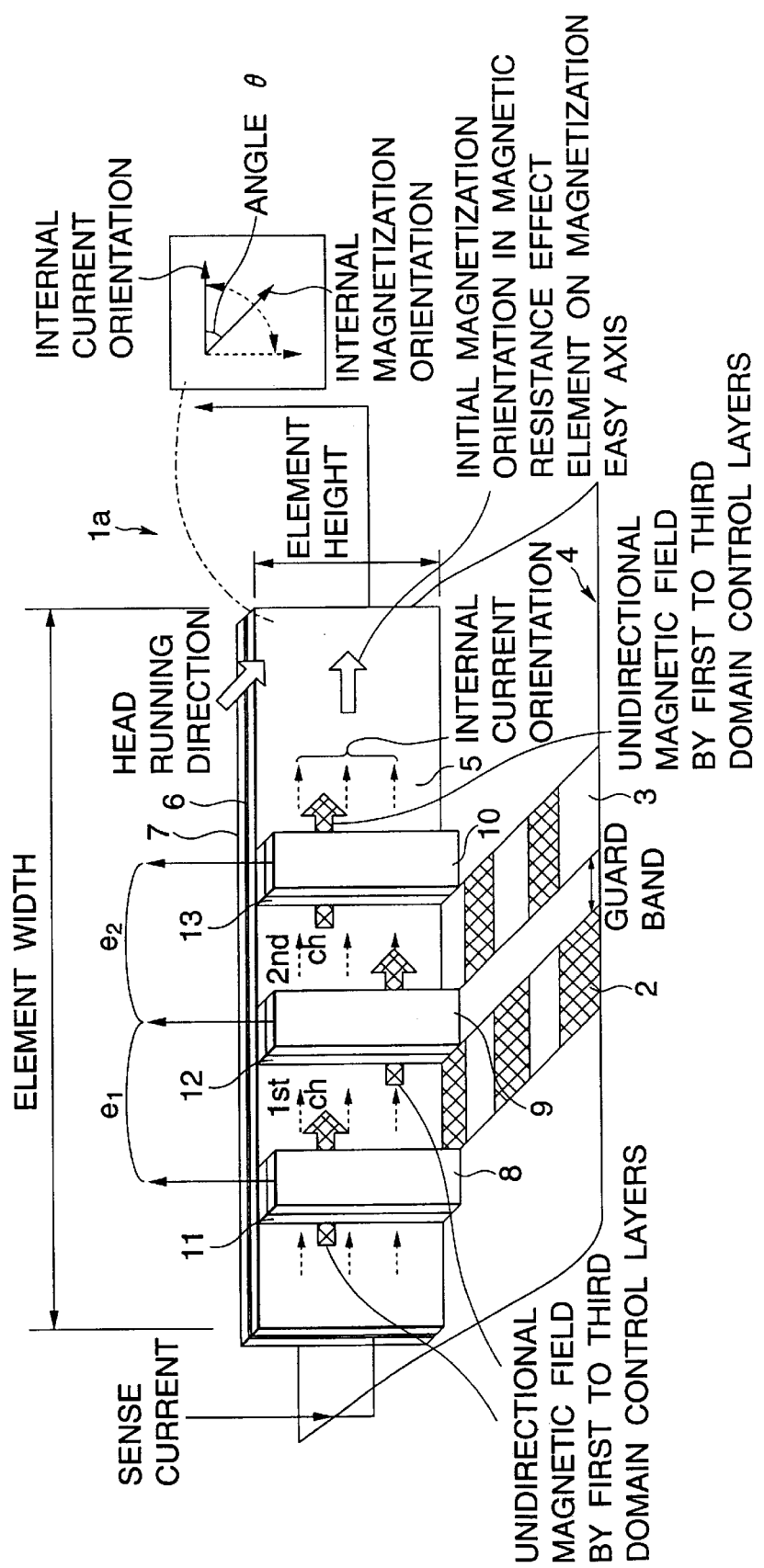
FIG. 1 is a diagram showing an arrangement of a magnetic reproducing head which is a first embodiment of the present invention.

FIG. 1 is a diagram showing an arrangement of a magnetic reproducing head which is a first embodiment of the present invention. In a magnetic reproducing head 1 a shown in FIG. 1, a single magnetoresistive effect element 5 is disposed crossing both a first recorded track 2 and a second recorded track 3 on a magnetic recording medium 4 to be subjected to reproduction process. The magnetoresistive effect element 5 is disposed such that it is elongated in a direction orthogonal to the head running direction on the magnetic recording medium and oriented in the direction perpendicular to the recording surface of the magnetic recording medium 4. The width (element width) of the magnetoresistive effect element 5 is at least three times as long as the height (element height) of the magnetoresistive effect element. An initial magnetization of the magnetoresistive effect element 5 has an orientation which is either of the orientations of the easy axis of magnetization, longitudinally extended (in FIG. 1, it is directed to the right).

As shown in FIG. 1, a sense current is fed to one end of the magnetoresistive effect element 5, and it is derived from the other end of the same, whereby an internal current is caused to flow in the easy axis direction (longitudinal direction) of the magnetoresistive effect element 5. In the instance of FIG. 1, the internal current flows in the direction of the initial magnetization of the single magnetoresistive effect element. If required, the sense current may be made to flow in the reverse direction. An angle θ between an orientation of the internal magnetization and an orientation of the internal current of the magnetoresistive effect element 5, is set at a predetermined angle in a range of 10° to 80° or another range of 100° to 170° in the initial state of the magnetic reproducing head. To this end, a nonmagnetic spacer layer 6 is layered on the back surface of the magnetoresistive effect element 5. Further, a bias thin film 7 is layered on the back surface of the nonmagnetic spacer layer 6.

The bias thin film 7 may be a soft magnetic thin film, a hard magnetic thin film or a nonmagnetic conductive film. Use of any of those thin films is used for the bias thin film 7 causes the resultant magnetic reproducing head to produce a high reproduction output signal.

First to third domain control layers 11 to 13 each having the width shorter than the width of the guard band are layered on the front side of the magnetoresistive effect element 5 vertically disposed on the guard bands of the magnetic recording medium 4. The guard bands are regions having no information therein. First to tenth detecting electrodes 8 to 10 are disposed on the front sides of the first to third domain control layers 11 to 13, respectively. The first to third magnetic domain control layers 11 to 13 may be antiferromagnetic thin films or hard ferromagnetic thin films each having the same orientation as an orientation of the initial magnetization in the single magnetoresistive effect element on the easy axis of the magnetoresistive effect element 5. The magnetic reproducing head, which is a first embodiment of the present invention, may take six forms, first to six magnetic reproducing heads, in accordance with a combination of the material of the bias thin film 7 and the materials of the first to third domain control layers 11 to 13.

The first magnetic reproducing head uses a soft magnetic thin film for the bias thin film 7, and antiferromagnetic thin films for the first to third domain control layers 11 to 13. An orientation of the soft magnetic thin film used for the bias thin film 7 is set upward or downward when viewed in the element height directions. A bias magnetic field directed upward or downward in the element height directions is applied to the magnetoresistive effect element 5, by the leaking magnetic field.

A magnetic field directed in an orientation of an initial magnetization in the single magnetoresistive effect element on the easy axis of magnetization in the magnetoresistive effect element 5 is applied to a region of the magnetoresistive effect element 5 vertically disposed on the guard band, by exchange bond at the interface of the antiferromagnetic thin films used for the first to third domain control layers 2.1 to 13 and the magnetoresistive effect element 5 vertically disposed on the guard band.

In the first magnetic reproducing head 1a according to the first embodiment of the present invention, a sense current is fed to the magnetoresistive effect element 5, and internal current flows through the magnetoresistive effect element 5. The magnetic recording medium 4 is moved in a state that an internal magnetization of the magnetoresistive effect element is slanted 10° to 80° with respect to the orientation of the internal current by the bias thin film 7. With the medium movement, resistance of the magnetoresistive effect element 5 in the 1st CH region varies in accordance with a magnetic flux leaking from the first recorded track 2. A resistance variation is converted into a voltage variation through the sense current. A potential difference between a voltage appearing at the first detecting electrode 8 and a voltage appearing a the second detecting electrode 9 is output in the form of a first reproduced signal e1, which represents information stored in the first recorded track 2. A second reproduced signal e2 is also produced in a similar manner.

In the first embodiment using the antiferromagnetic thin films for the first to third domain control layers 11 to 13, a unidirectional magnetic field being directed in an orientation of an initial magnetization in a single magnetoresistive effect element on the easy axis of magnetization in the magnetoresistive effect element 5 is applied to the region of the magnetoresistive effect element 5 vertically disposed on the guard band, through the exchange bond at the interface between the antiferromagnetic thin films used for the first to third domain control layers 11 to 13 and the magnetoresistive effect element 5 vertically disposed on the guard band. Therefore, a magnetic interactive action in the magnetoresistive effect element 5 impedes propagation of a signal component detected from an adjacent recorded track to the region of the magnetoresistive effect element 5 located above a recorded track to be under reproduction process.

Therefore, the magnetic reproducing head of the invention suppresses a reproduction cross talk from an adjacent recorded track even when track pitch is narrow. Further, it efficiently control the magnetic domain of the magnetoresistive effect element 5 by applying the unidirectional magnetic field to the region of the magnetoresistive effect element vertically disposed on the guard band. The result is that Barkhausen noises are considerably reduced and a multi-channel MRE thin-film magnetic head for high track density reproduction is realized.

The second magnetic reproducing head will be described. The second magnetic reproducing head uses a soft magnetic thin film for the bias thin film 7, and hard magnetic thin films for the first to third domain control layers 11 to 13. An orientation of the magnetization of the hard magnetic thin film of each of the first to third domain control layers 11 to 13 is set to be coincident with an orientation of an initial magnetization in the single magnetoresistive effect element on the easy axis of the magnetoresistive effect element 5. With such an orientation setting, as in the first embodiment, a unidirectional magnetic field directed in the orientation of the initial magnetization in the single magnetoresistive effect element on the easy axis of the magnetoresistive effect element 5, is applied to the region of the magnetoresistive effect element 5 vertically disposed at the guard band.

The third magnetic reproducing head uses a hard magnetic thin film for the bias thin film 7, and antiferromagnetic thin films for the first to third domain control layers 11 to 13. The fourth magnetic reproducing head uses a hard magnetic thin film for the bias thin film 7, and hard magnetic thin films for the first to third domain control layers 11 to 13. In those magnetic reproducing heads, a magnetization of the hard magnetic thin film used for the bias thin film 7 is oriented upward or downward in the element height directions. A bias magnetic field, which is oriented downward or upward in the directions of the-element height, is applied to the magnetoresistive effect element 5 by the leaking magnetic flux.

The fifth magnetic reproducing head uses a nonmagnetic thin film for the bias thin film 7, and antiferromagnetic thin films for the first to third domain control layers 11 to 13. In the fifth magnetic reproducing head using the nonmagnetic conductive film for the bias thin film 7, a current is made to flow into the nonmagnetic conducive film in the direction of the easy axis of the magnetoresistive effect element 5, in addition to the current fed to the magnetoresistive effect element 5. As a result, a bias magnetic field, which is oriented upward or downward in the element height directions, is applied to the magnetoresistive effect element 5. The sixth magnetic reproducing head uses a nonmagnetic thin film for the bias thin film 7, and hard magnetic thin films for the first to third domain control layers 11 to 13. It is readily understood that the second to sixth magnetic reproducing heads have useful effects comparable with those of the first magnetic reproducing head.

Another magnetic reproducing head may be constructed such that a—soft magnetic thin film or a hard magnetic thin film may be used for the bias thin film 7, and the nonmagnetic spacer layer 6 may be formed with a conductive film. In this magnetic reproducing head, a more effective bias magnetic field is applied to the magnetoresistive effect element 5 in a manner that an orientation of a leaking magnetic field from the hard and soft magnetic thin film is coincident with an orientation of a magnetic field which is generated when part of the sense current flows into the hard and soft magnetic thin films via the nonmagnetic spacer layer 6.

Second Embodiment

Figure 2:
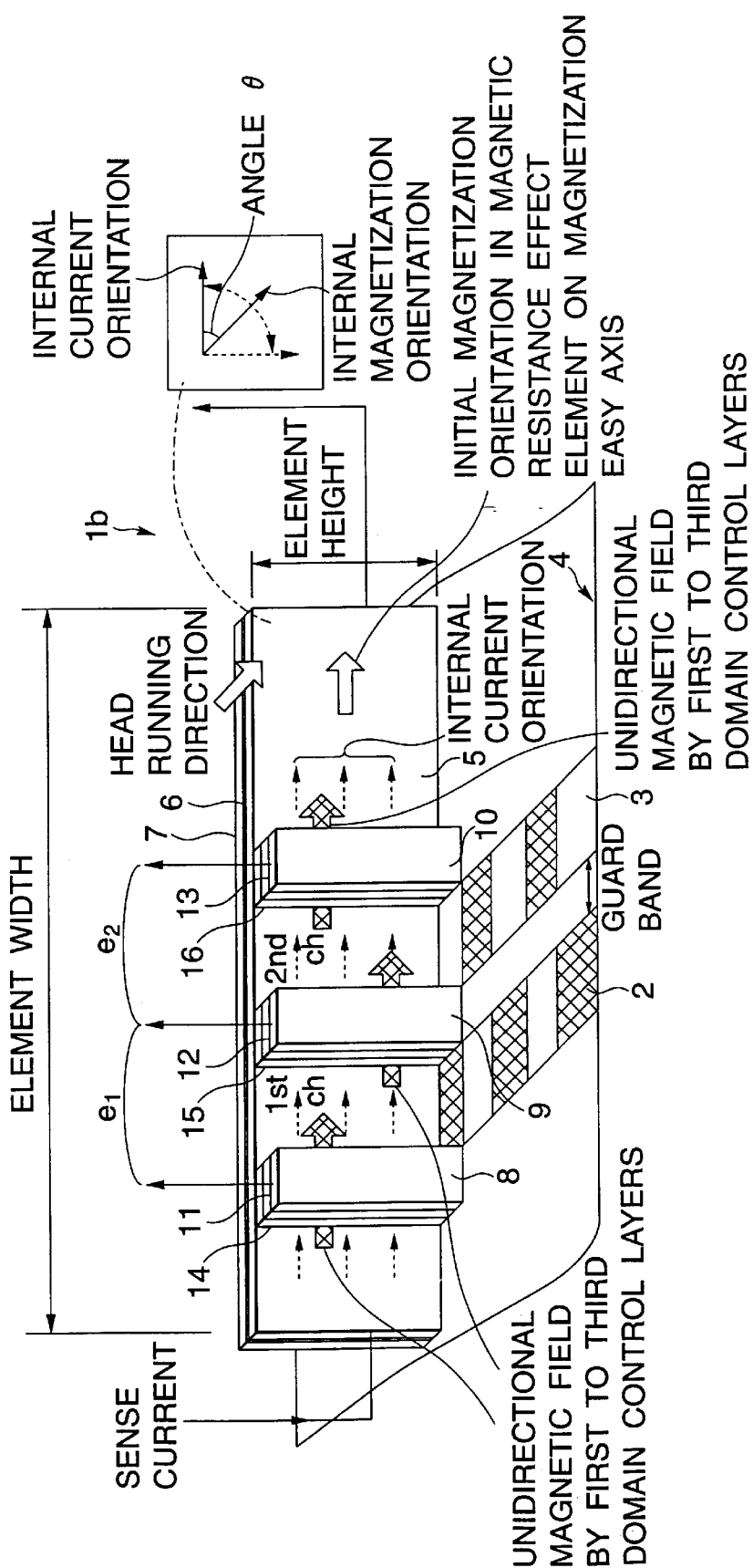
FIG. 2 is a diagram showing an arrangement of a magnetic reproducing head which is a second embodiment of the present invention.

FIG. 2 is a diagram showing an arrangement of a magnetic reproducing head which is a second embodiment of the present invention. Like reference numerals are used for designating like or equivalent portions in FIG. 1. A magnetic reproducing head 1b is different from the magnetic reproducing head 1a in that first to third nonmagnetic conductive layers 14 to 16 are interposed between the first to third domain control layers 11 to 13 and the magnetoresistive effect element 5. In the structure of FIG. 2, the first to third domain control layers 11 to 13 consist of hard magnetic thin films each having the magnetization orientation is displaced 180° from an orientation of the initial magnetization in the single magnetoresistive effect element on the easy axis of the magnetoresistive effect element 5.

In the structure of the magnetic reproducing head, a unidirectional magnetic field directed in an orientation of the initial magnetization in the single magnetoresistive effect element on the easy axis of the magnetoresistive effect element 5 is applied to the magnetoresistive effect element 5 by a leaking magnetic field of the hard magnetic thin films 5 as the first to third domain control layers 11 to 13. The result is that reproduction cross talk from an adjacent recorded track is suppressed, and the magnetic domain control of the magnetoresistive effect element 5 is possible.

Provision of the nonmagnetic conductive layers 14 to 16 secures conduction between each detecting electrode and the magnetoresistive effect element 5, and prevents generation of an exchange interactive action between the hard magnetic thin film and the magnetoresistive effect element 5. Therefore, the second embodiment can more effectively suppress reproduction cross talk, and can effect the domain control of the magnetoresistive effect element 5.

The process of reproduced signals from the first recorded track 2 and the second recorded track 3 is similar to that in the first embodiment, and hence no further description of it will be given here.

The magnetic reproducing head of the second embodiment may take three forms of magnetic reproducing heads, the seventh to ninth magnetic reproducing heads. The seventh magnetic reproducing head uses a soft magnetic thin film for the bias thin film 7; the eighth magnetic reproducing head uses a hard magnetic thin film for the bias thin film 7; and the ninth magnetic reproducing head uses a nonmagnetic conductive film for the bias thin film 7.

Third Emodiment

Figure 3:
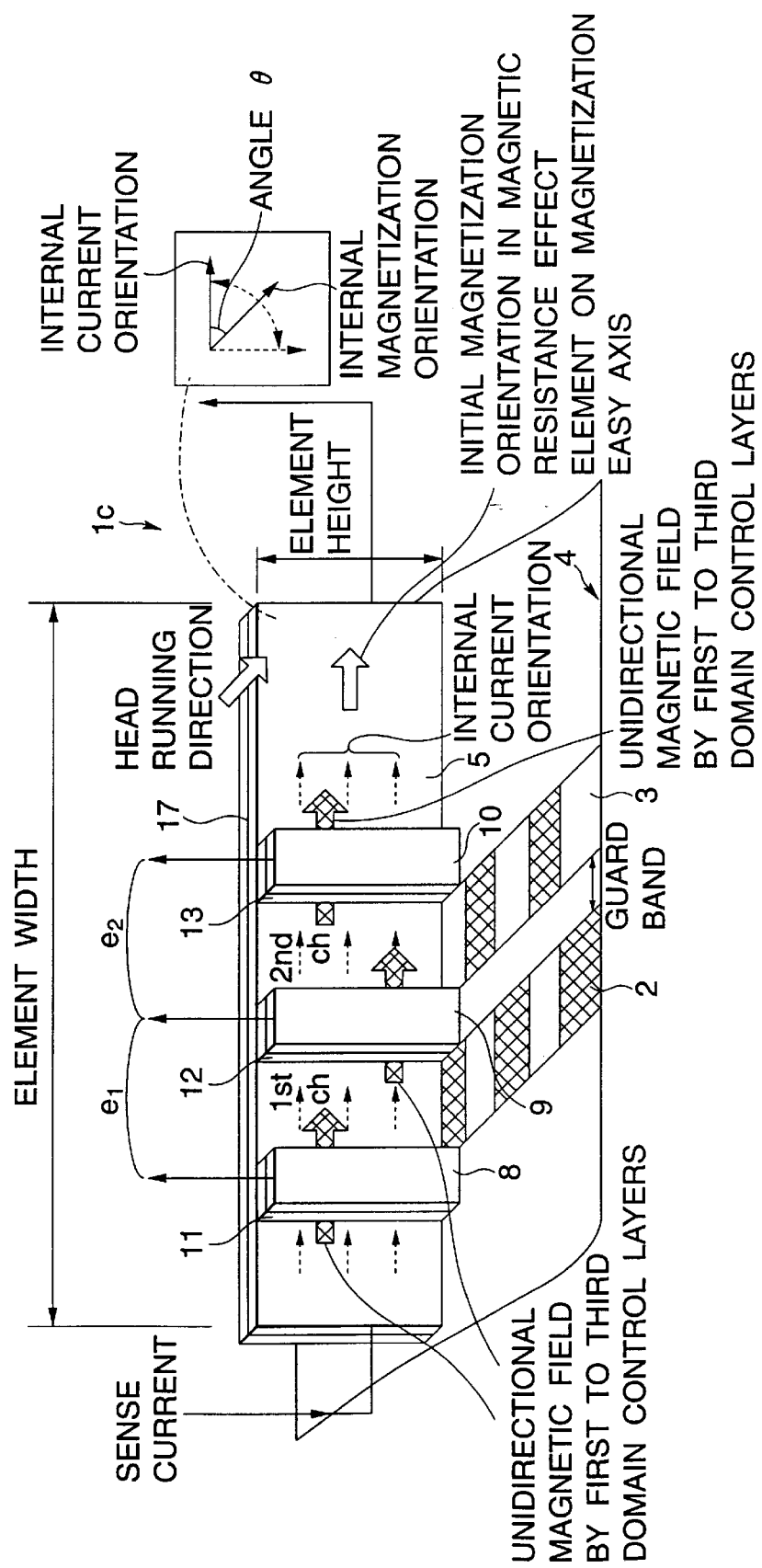
FIG. 3 is a diagram showing an arrangement of a magnetic reproducing head which is a third embodiment of the present invention.

FIG. 3 is a diagram showing an arrangement of a magnetic reproducing head which is a third embodiment of the present invention. Like reference numerals are used for designating like or equivalent portions in FIG. 1. A magnetic reproducing head 1c is different from the magnetic reproducing head 1a in that the nonmagnetic spacer layer 6 disposed in close contact with the rear side of the magnetoresistive effect element 5, and the bias thin film 7 disposed on the rear side of the nonmagnetic spacer layer 6 are removed, and instead of those, a bias nonmagnetic conductive film 17 of 20 $\mu\Omega$-cm or larger in resistivity is disposed on the rear side of the magnetoresistive effect element 5.

In the magnetic reproducing head 1c, a sense current flows into both the magnetoresistive effect element 5 and the bias nonmagnetic conductive film 17. In this case, most of the sense current flows into the magnetoresistive effect element 5, while the remaining current flows into the bias nonmagnetic conductive film 17. This is because the thin film of 20 $\mu\Omega$-cm or larger is used for the bias nonmagnetic conductive film 17.

With the current shunted into the bias nonmagnetic conductive film 17, the bias magnetic field oriented upward or downward (downward in FIG. 3) in the element height directions is applied to the magnetoresistive effect element 5. An angle $\theta$ between the orientation of the internal magnetization and the orientation of the internal current is set at a predetermined value within 10° to 80° or 100° to 170° (45° in FIG. 3). This angle value defines an initial state of the magnetic reproducing head.

In the present embodiment, the bias nonmagnetic conductive film 17, which is for developing a bias magnetic field oriented upward or downward in the element (=magnetoresistive effect element) height by flowing part of the sense current into the magnetoresistive effect element in its longitudinal direction, is disposed on the rear side of the magnetoresistive effect element 5. Therefore, an amplitude of the reproduced signal detected by the detecting electrodes is increased. As a result, even when the track pitch is narrow, a high reproduced signal is output from the magnetic reproducing head. While the nonmagnetic spacer layer 6 and the bias thin film 7 are used in the first embodiment, those layer and film are replaced with the single bias nonmagnetic conductive film 17 in the present embodiment. Therefore, the magnetic reproducing head 1c is simplified in structure.

The magnetic reproducing head of the third embodiment may take two forms of the magnetic reproducing heads, the 10th magnetic reproducing head and the 11th magnetic reproducing head, depending on the kind of a material used for the first to third domain control layers 11 to 13. The 10th magnetic reproducing head uses antiferromagnetic thin films for the first to third domain control layers 11 to 13; the eleventh magnetic reproducing head uses hard thin films for the first to third domain control layers 11 to 13; and the 11th magnetic reproducing head uses hard magnetic thin films for the first to third domain control layers 11 to 13. The 10th and 11th magnetic reproducing heads can produce useful effects comparable with those of the first embodiment.

Fourth Embodiment

Figure 4:
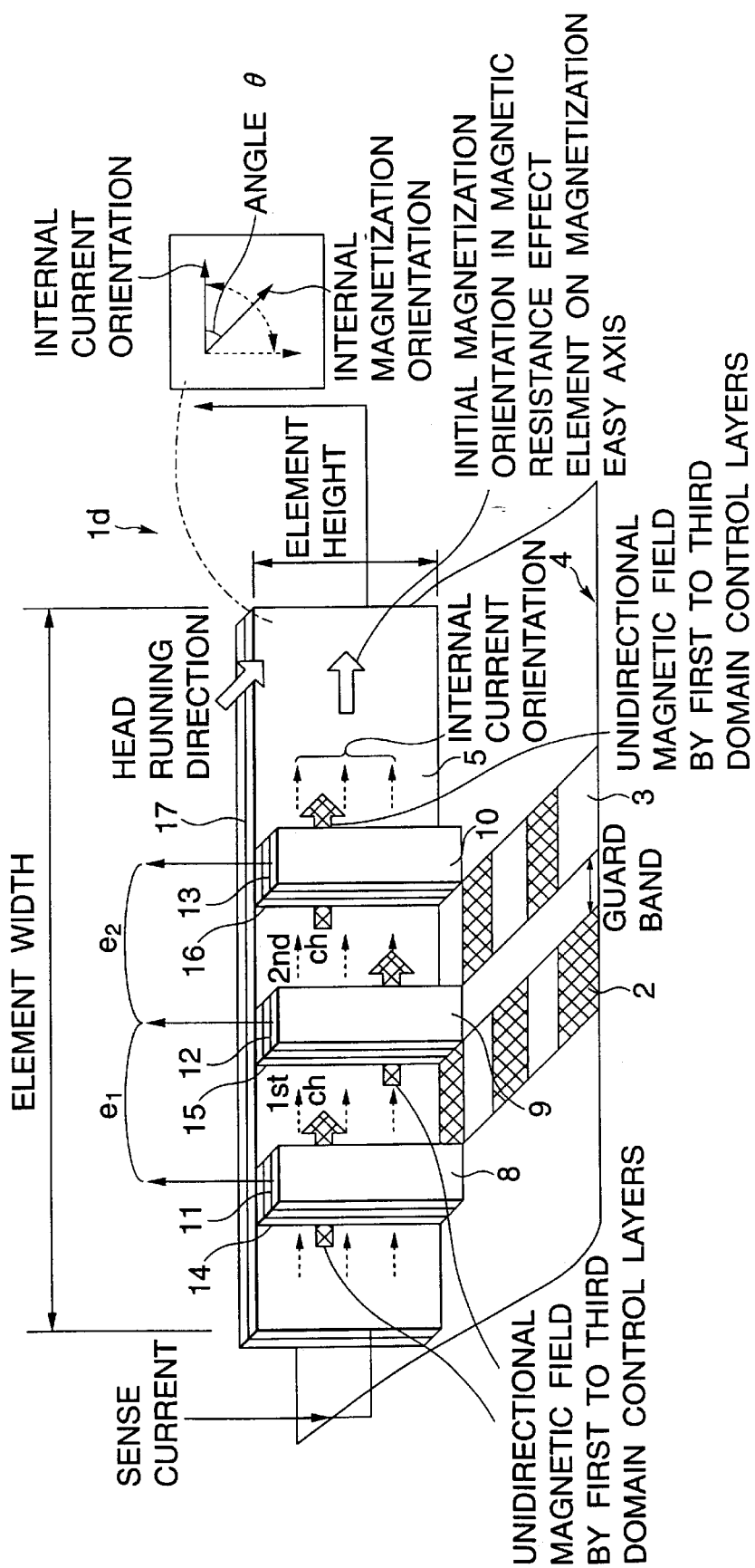
FIG. 4 is a diagram showing an arrangement of a magnetic reproducing head which is a fourth embodiment of the present invention.

FIG. 4 is a diagram showing an arrangement of a magnetic reproducing head which is a fourth embodiment of the present invention. Like reference numerals are used for designating like or equivalent portions in FIG. 1. A magnetic reproducing head 1c is different from the magnetic reproducing head 1a in that nonmagnetic conductive layers 14 to 16 are disposed between the first to third domain control layers 11 to 13 and the magnetoresistive effect element 5. The first to third domain control layers 11 to 13 consist of hard magnetic thin films which are magnetized in a direction displaced 180° from an orientation of the initial magnetization of the single magnetoresistive effect element on the easy axis of the magnetoresistive effect element 5. The magnetic reproducing head 1d of the fourth embodiment corresponds to the 12th magnetic reproducing head.

The magnetic reproducing head 1a has useful effects comparable with those of the first embodiment. By a leaking magnetic field leaking from the hard magnetic thin films as the first to third domain control layers 11 to 13, a unidirectional magnetic field directed in an orientation of the initial magnetization of the single magnetoresistive effect element on the easy axis of the magnetoresistive effect element 5 is applied to the magnetoresistive effect element 5. The result is to suppress reproduction cross talk from an adjacent recorded track, to be able to effect the magnetic domain of the magnetoresistive effect element 5 and to enable the magnetic reproducing head with a single structure to produce a high reproduction output signal.

Provision of the first to third nonmagnetic conductive layers 14 to 16 produces the following useful effects: conduction between each detecting electrode and the magnetoresistive effect element 5 is secured; exchange interactive action performed between the hard magnetic thin film and the magnetoresistive effect element 5 is obviated; and the domain control of the magnetoresistive effect element 5 is possible.

Fifth Embodiment

FIG. 5 is a diagram showing an arrangement of a magnetic reproducing head which is a fifth embodiment of the present invention. Like reference numerals are used for designating like or equivalent portions in FIG. 1. Differences of a magnetic, reproducing head Ic from the magnetic reproducing head 1a will be described. In the fifth embodiment, the nonmagnetic spacer layer 6 layered on the rear side of the magnetoresistive effect element 5 and the bias thin film 7 (FIG. 1) are removed. First to third domain control layers 11 to 13 bonded on the front side of the magnetoresistive effect element 5 and the first to third detecting electrodes 8 to 10 bonded on the front side of the first to third domain control layers are slanted at predetermined angle on the bonding surfaces. A first channel (1st CH) is located between the first detecting electrode 8 and the second detecting electrode 9. A second channel (2nd CH) is located between the second detecting electrode 9 and the third detecting electrode 10. A sense current (first sense current, second sense current) is made to flow into the region between each pair of the detecting electrode. An angle between an orientation of the internal current in each channel region of the magnetoresistive effect element 5 and an orientation of the initial magnetization in the single magnetoresistive effect element on the easy axis of the magnetoresistive effect element 5 is set at a predetermined value of angle (45° in FIG. 5) between 10° to 80° or between 100° to 170°. This angle value defines an initial state of the magnetic reproducing head.

The magnetic reproducing head of the fifth embodiment may takes two variations, 13th and 14th magnetic reproducing heads, depending on a kind of material used for the first to third domain control layers 11 to 13. The 13th magnetic reproducing head uses an antiferromagnetic thin film for the first to third domain control layers 11 to 13, and the 14th magnetic reproducing head uses hard magnetic thin films for the same. The 13th and 14th magnetic reproducing heads produce useful effects comparable with those of the first embodiment.

The operation principle of the magnetic reproducing head le shown in FIG. 5 will be described. In this reproducing head, the first to third detecting electrodes 8 to 10 are slanted at a predetermined angle, and a sense current is made to flow the region between each pair of the detecting electrodes. Accordingly, as shown in FIG. 5 where θ=45, the angle θ between the orientation of the internal current and the internal magnetization may be set as $10°≤θ≤80°$ or $100°≤θ≤170°$ in the initial state. If the direction of the internal current is reversed, the angle θ takes the following range: $100°≤θ≤170°$.

Figure 6A:
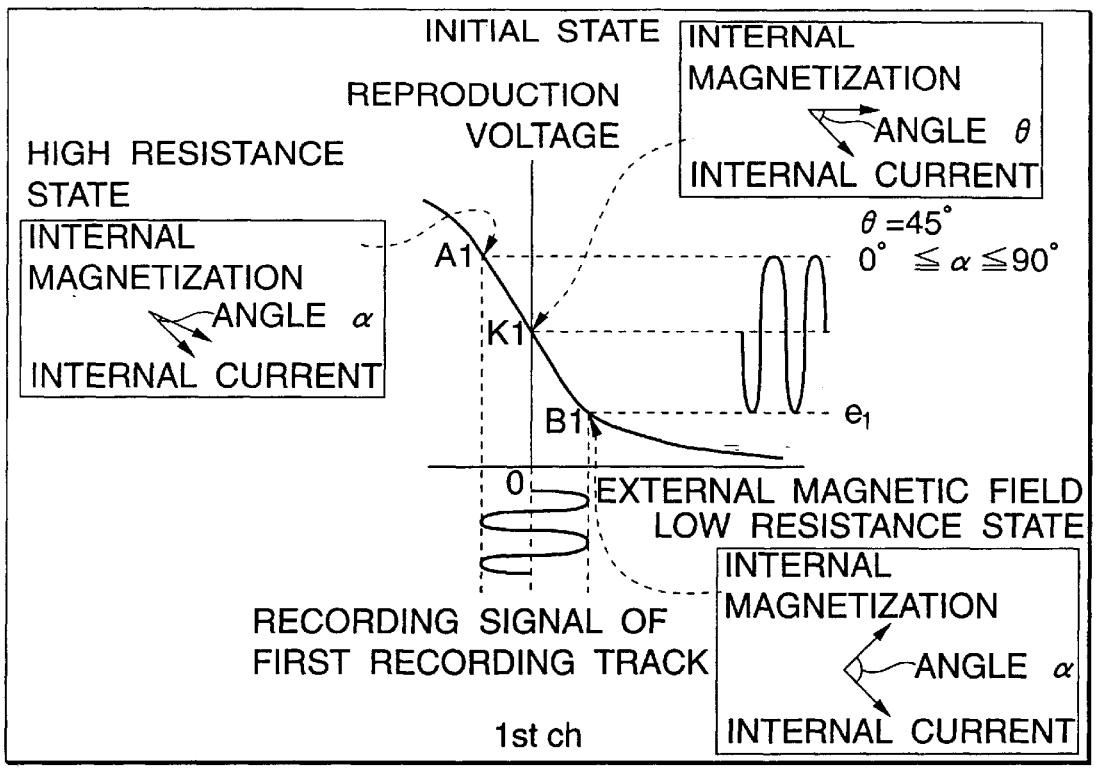
FIGS. 6A and 6B are diagrams showing how the magnetic reproducing head produces a reproduced signal in connection with a recording signal in each recorded track in the fifth embodiment.

The orientation of the internal magnetization of the magnetoresistive effect element 5 located in the region of the 1st CH is rotated with respect to the orientation of the internal current by an angle α defined as $0°≤α≤90°$ in accordance with a magnitude of a leaking magnetic flux by the signal recorded in the first track on the magnetic recording medium 4. As a result, as shown in FIG. 6A, a resistance of the magnetoresistive effect element 5 located in the region of the 1st CH varies. As a result, a reproduction voltage varies in accordance with the recording signal of the first track 2 in the following way: B1 (low resistance state)—K1 (initial state)—A1 (high resistance state). In this way, a first reproduced signal e1 is produced.

Figure 6B:
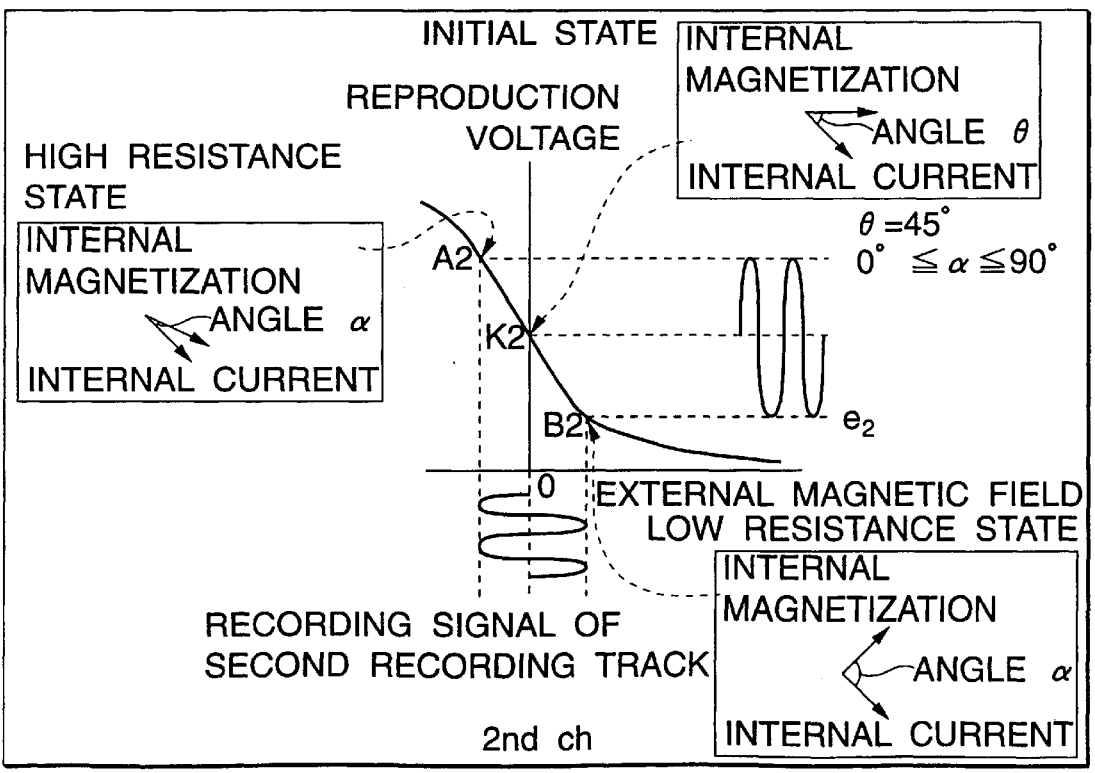

Similarly, the orientation of the internal magnetization of the magnetoresistive effect element 5 located, in the region of the 2nd CH is rotated with respect to the orientation of the internal current by an angle α defined as $0°≤α≤90°$ in accordance with a magnitude of a leaking magnetic flux by the signal recorded in the second track on the magnetic recording medium 4. As a result, as shown in FIG. 6B, a resistance of the magnetoresistive effect element 5 located in the region of the 2nd CH varies. As a result, a reproduction voltage varies in accordance with the recording signal of the first track 2 in the following way: First recorded track 2 (high resistance state)—K2 (initial state)—B2 (low resistance state). In this way, a second reproduced signal e2 is produced. Accordingly, the fifth embodiment produces useful effects as the first embodiment, and the effect, which results from the use of the nonmagnetic spacer layer 6 and the bias thin film 7 can equivalently be obtained not using the nonmagnetic spacer layer 6 and the bias thin film 7 as in the first embodiment.

Sixth Embodiment

FIG. 7 is a diagram showing an arrangement of a magnetic reproducing head which is a sixth embodiment of the present invention. Like reference numerals are used for designating like or equivalent portions in FIG. 5. A magnetic reproducing head 1f of the present embodiment is different from the magnetic reproducing head 1e in that first to third nonmagnetic conductive layers 14 to 16 are interposed between the first to third domain control layers 11 to 13 and the magnetoresistive effect element 5. The magnetic reproducing head 1f corresponds to a 15th magnetic reproducing head. The first to third domain control layers 11 to 13 consist of hard magnetic thin films, each being magnetized in a direction displaced 180° from the orientation of the initial magnetization in the single magnetoresistive effect element on the easy axis of the magnetoresistive effect element 5.

The magnetic reproducing head 1f thus constructed yields useful effects comparable with those of the fifth embodiment. By a leaking magnetic field of the hard magnetic thin films as the first to third domain control layers 11 to 13, a unidirectional magnetic field directed to have an orientation coincident with an orientation of the initial magnetization in the single magnetoresistive effect element on the easy axis of the magnetoresistive effect element 5 is applied to the magnetoresistive effect element 5. As a result, the reproduction crosstalk from an adjacent recorded track is suppressed. The domain control of the magnetoresistive effect element 5 is possible. The effect, which results from the use of the nonmagnetic spacer layer 6 and the bias thin film 7 can equivalently be obtained not using the nonmagnetic spacer layer 6 and the bias thin film 7 as in the first embodiment.

Seventh Embodiment

FIG. 8 is a diagram showing an arrangement of a magnetic reproducing head which is a sixth embodiment of the present invention. Like reference numerals are used for designating like or equivalent portions in FIG. 5. Major difference of a magnetic reproducing head 1g shown in FIG. 8 from the magnetic reproducing head 1a shown in FIG. 1 will be described. In the FIG. 8 embodiment, the nonmagnetic spacer layer 6 and the bias thin film 7 are removed. A spin bulb type magnetoresistive effect element is used as the magnetoresistive effect element 5. In this element, an antiferromagnetic thin film 24, a ferromagnetic thin film (referred to as a pinned layer) 23, and a ferromagnetic thin film (referred to as a free layer) 21 are layered while a nonmagnetic conductive layer 22 interposed therebetween. The magnetization of the pinned layer 23 is fixedly oriented upward or downward (downward in FIG. 8) in the height of the magnetoresistive effect element by the axis in the free layer 21 is directed in the element width direction. The orientation of magnetization of the free layer 21 located in the region 1st CH is rotated to have an angle β (−90°) ≦β≦90° with respect to the orientation of the internal current in accordance with a magnitude of leaking flux by a signal stored in the first recorded track 2 of the magnetic recording medium 4. As a result, a resistance of the free layer 21 located in the region of the 1st CH varies. As a result, as shown in FIG. 6A, a resistance of the magnetoresistive effect element 5 located in the region of the 1st CH varies. As a result, a reproduction voltage varies in the following way: A1 (high resistance state)—K1 (initial state)—B1 (high resistance state). In this way, a first reproduced signal e1 is produced.

Similarly, the orientation of magnetization of the free layer 21 located in the region 2nd CH is rotated to have an angle β(−90°)≦β≦90° with respect to the orientation of the internal current in accordance with a magnitude of leaking flux by a signal stored in the second recorded track 3 of the magnetic recording medium 4. As a result, a resistance of the free layer 21 located in the region of the 2nd CH varies. As a result, as shown in FIG. 6B, a resistance of the magnetoresistive effect element 5 located in the region of the 1st CH varies. As a result, a reproduction voltage varies in the following way: B2 (high resistance state)—K2 (initial state)—A2 (high antiferromagnetic thin film 24. The orientation of magnetization of the free layer 21 of which an initial magnetization is fixed in the element widthwise direction is rotated in accordance with a magnitude of a leaking flux from the magnetic recording medium 4. Its resistance variation, which depends on a quantity of magnetization rotation, is converted into a voltage variation, and the voltage variation is output in the form of an output signal from the magnetic recording medium 4.

The magnetic reproducing head as the seventh embodiment of the present invention may take 16th to 17th magnetic reproducing heads, in accordance with a kind of material of the first to third domain control layers 11 to 13. The 16th magnetic reproducing head uses antiferromagnetic films for the first to third domain control layers 11 to 13. The 17th magnetic reproducing head uses hard magnetic thin films for the first to third domain control layers 11 to 13. The 16th to 17th magnetic reproducing heads have useful effects on the magnetic domain control layers, which are comparable with those of the first embodiment.

The operation principle of the magnetic reproducing head 1g shown in FIG. 8 will be described. The pinned layer 23 is magnetized in the upward or downward direction when viewed in the element height directions (downward in FIG. 8) to set up an initial state thereof. The initial magnetization on the easy resistance state). In this way, a second reproduced signal e2 is produced.

Figure 9A:
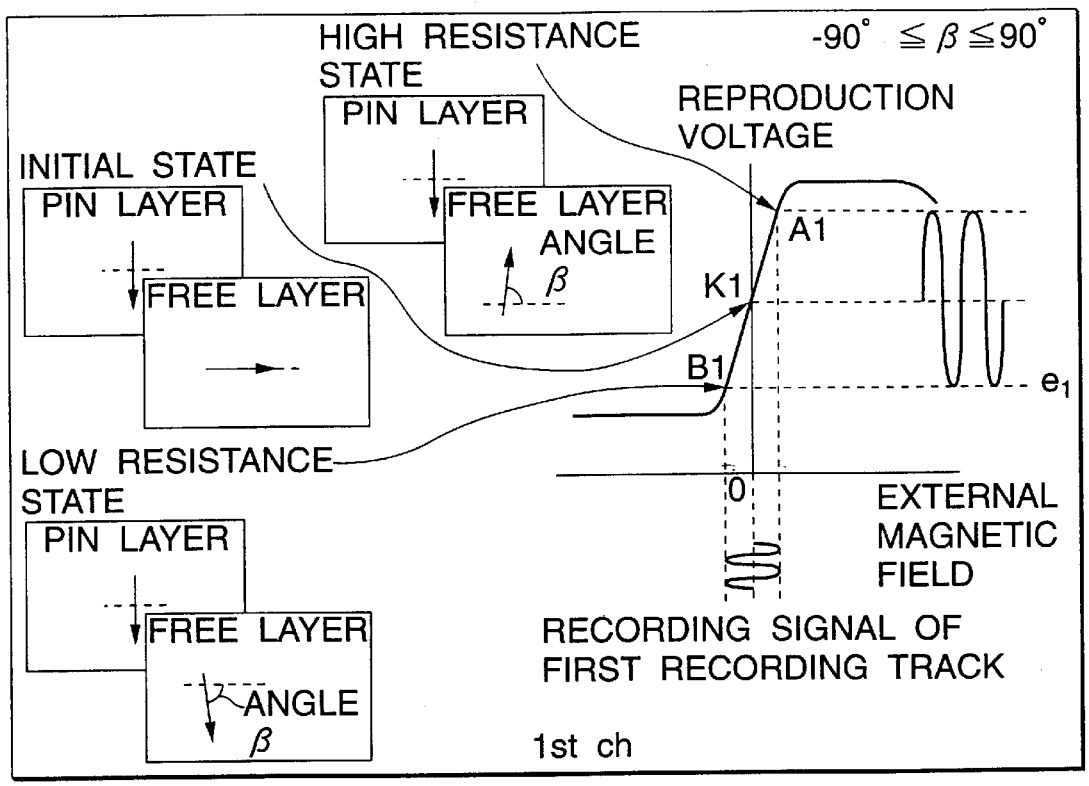
FIGS. 9A and 9B are diagrams showing how the magnetic reproducing head produces a reproduced signal in connection with a recording signal in each recorded track in the seventh embodiment.
Figure 9B:
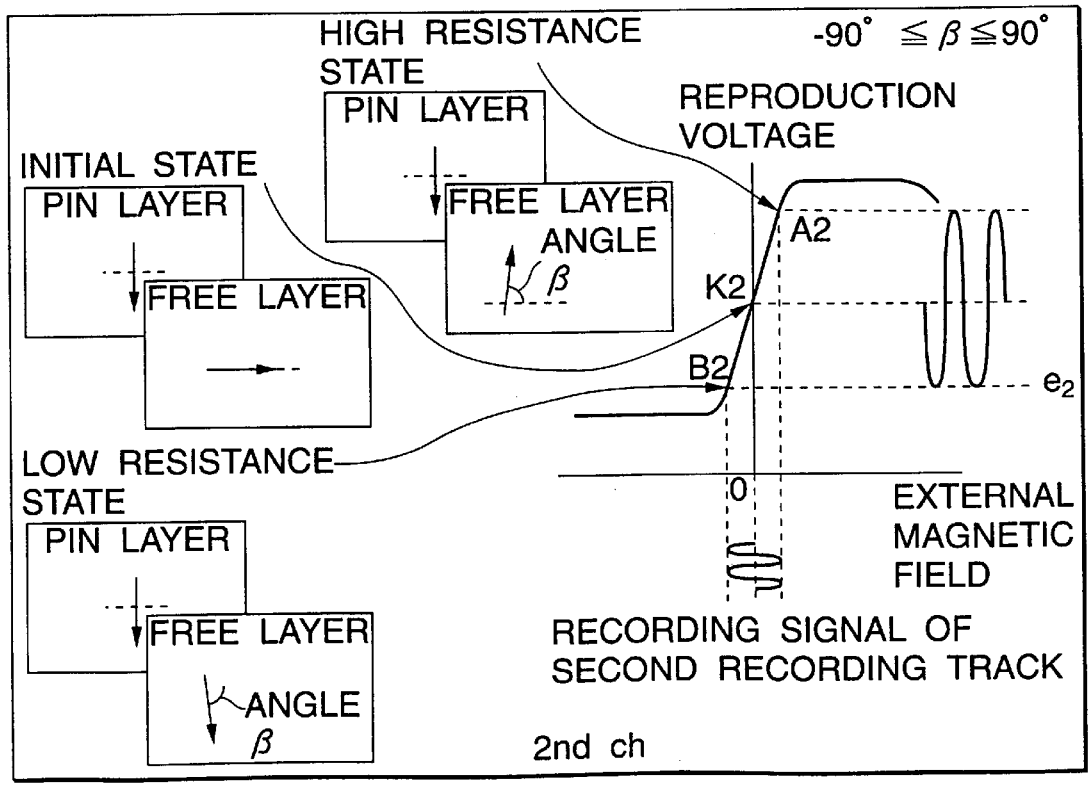

In the magnetic reproducing head 1g of the seventh embodiment, the magnetoresistive effect element 5 consists of the spin bulb type. Because of this, an amplitude of the reproduced signal detected by the detecting electrode may be increased. As seen from FIGS. 9A and 9B, the magnetic reproducing head of the present embodiment is capable of outputting a high reproduced signal (first reproduced signal e1, second reproduced signal e2) even if the tack pitch is narrow.

Eighth Embodiment

Figure 10:
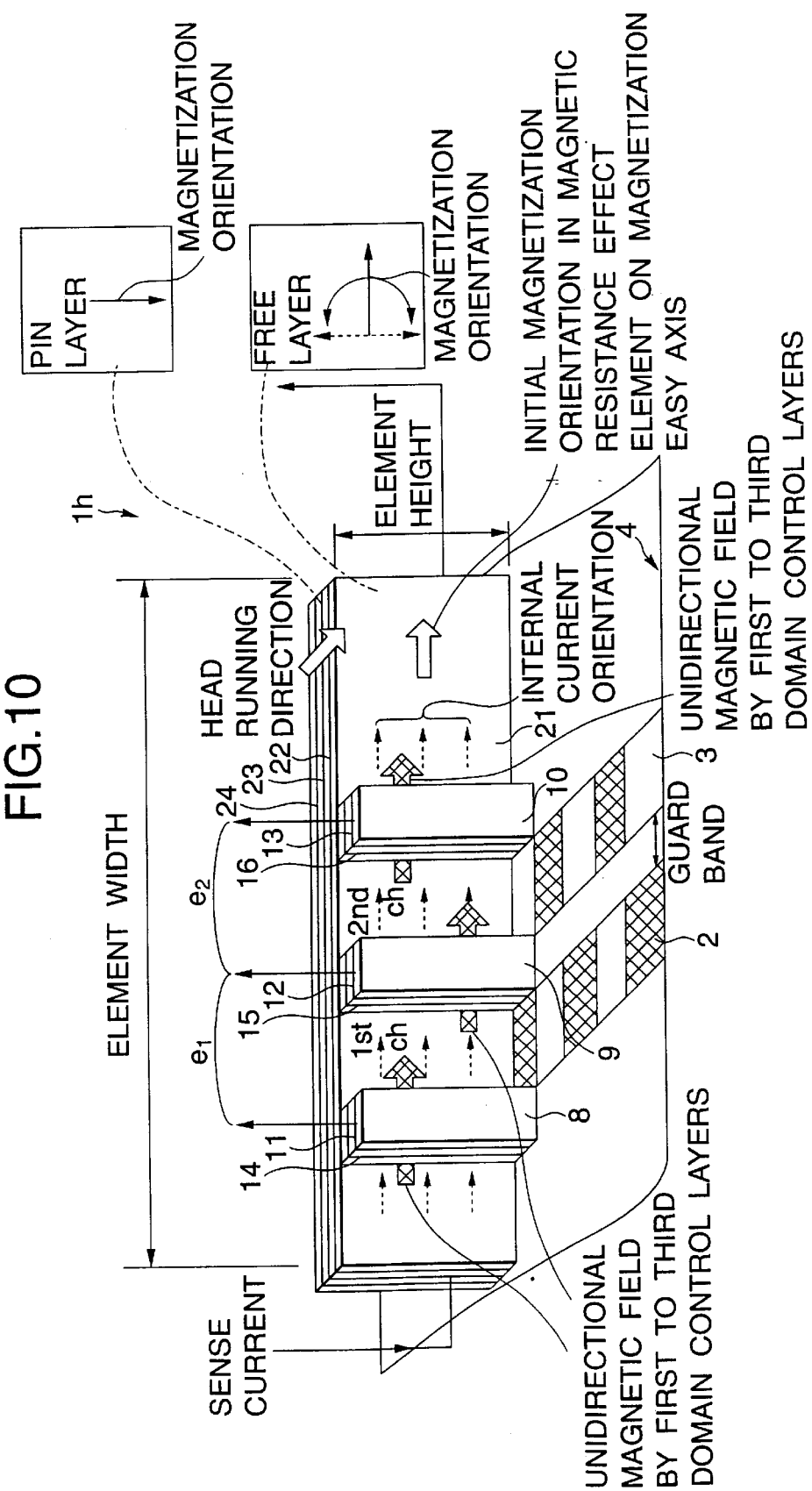
FIG. 10 is a diagram showing an arrangement of a magnetic reproducing head which is an eighth embodiment of the present invention.

FIG. 10 is a diagram showing an arrangement of a magnetic reproducing head which is an eighth embodiment of the present invention. Like reference numerals are used for designating like or equivalent portions in FIG. 8. A magnetic reproducing head 1h shown in FIG. 10 is different from the magnetic reproducing head 1g shown in FIG. 8 in that first to third nonmagnetic conductive layers 14 to 16 are interposed between the first to third domain control layers 11 to 13 and the free layer 21. The first to third domain control layers 11 to 13 consist of hard magnetic thin films each magnetized in the direction displaced 180° from the orientation of the initial magnetization on the easy axis of the free layer 21. The magnetic reproducing head 1h of the eighth embodiment corresponds to an 18th magnetic reproducing head.

The thus constructed magnetic reproducing head 1h has useful effects comparable with those of the 7th embodiment. A unidirectional magnetic field directed to have an orientation coincident with an orientation of magnetization on the easy axis of the free layer 21 is applied to the free layer 21 by a leaking magnetic field by the hard magnetic thin films as the first to third domain control layers 11 to 13. The advantageous results are to suppress the reproduction crosstalk from an adjacent recorded track, to be able to control the magnetic domain in the free layer 21, and to produce a high reproduced signal even if the tack pitch is narrow.

Figure 11:
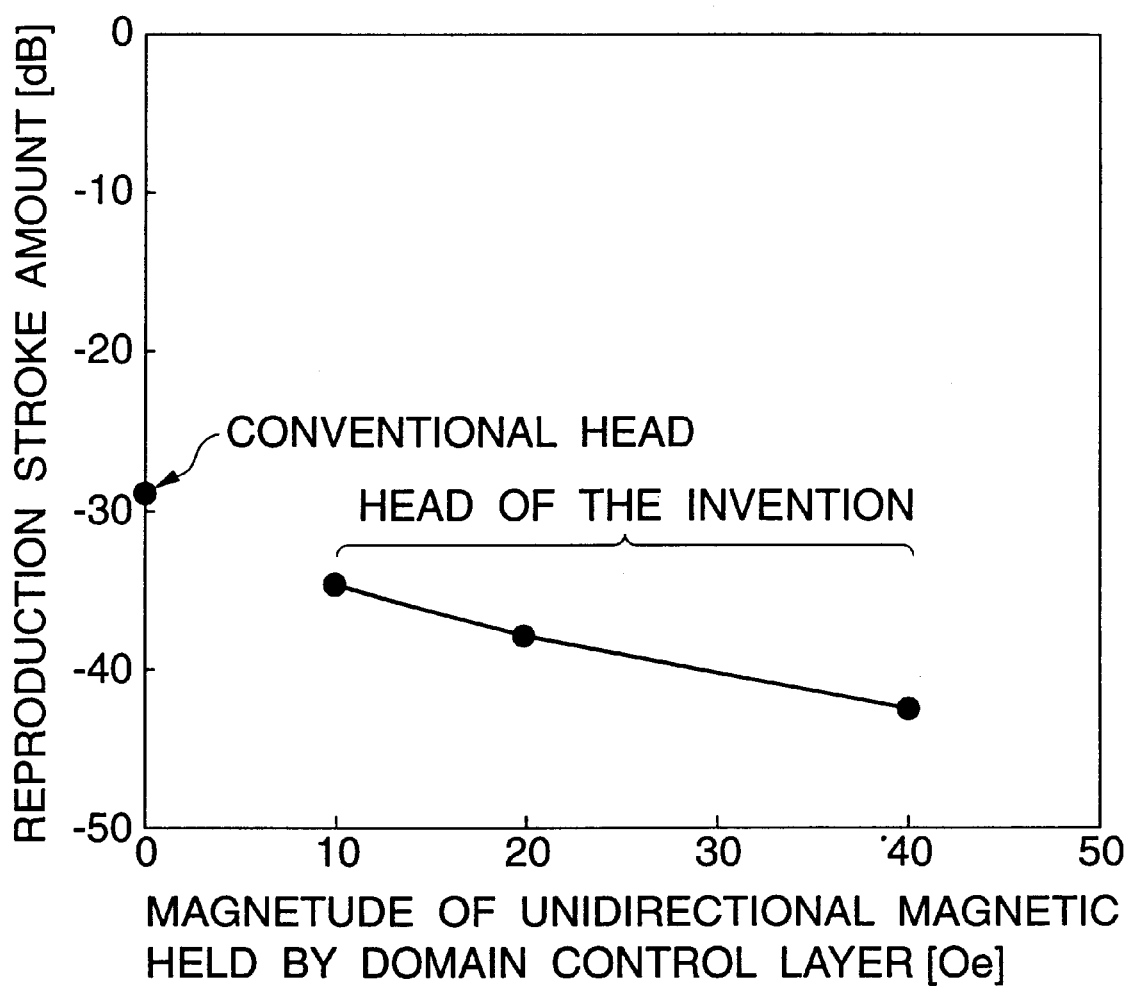
FIG. 11 is a graph showing a variation of a reproduction crosstalk quantity with respect to a magnitude of a unidirectional magnetic field by the domain control layer, which was measured for the magnetic reproducing head of the invention and the conventional multi-channel MRE thin-film magnetic head.
Figure 12:
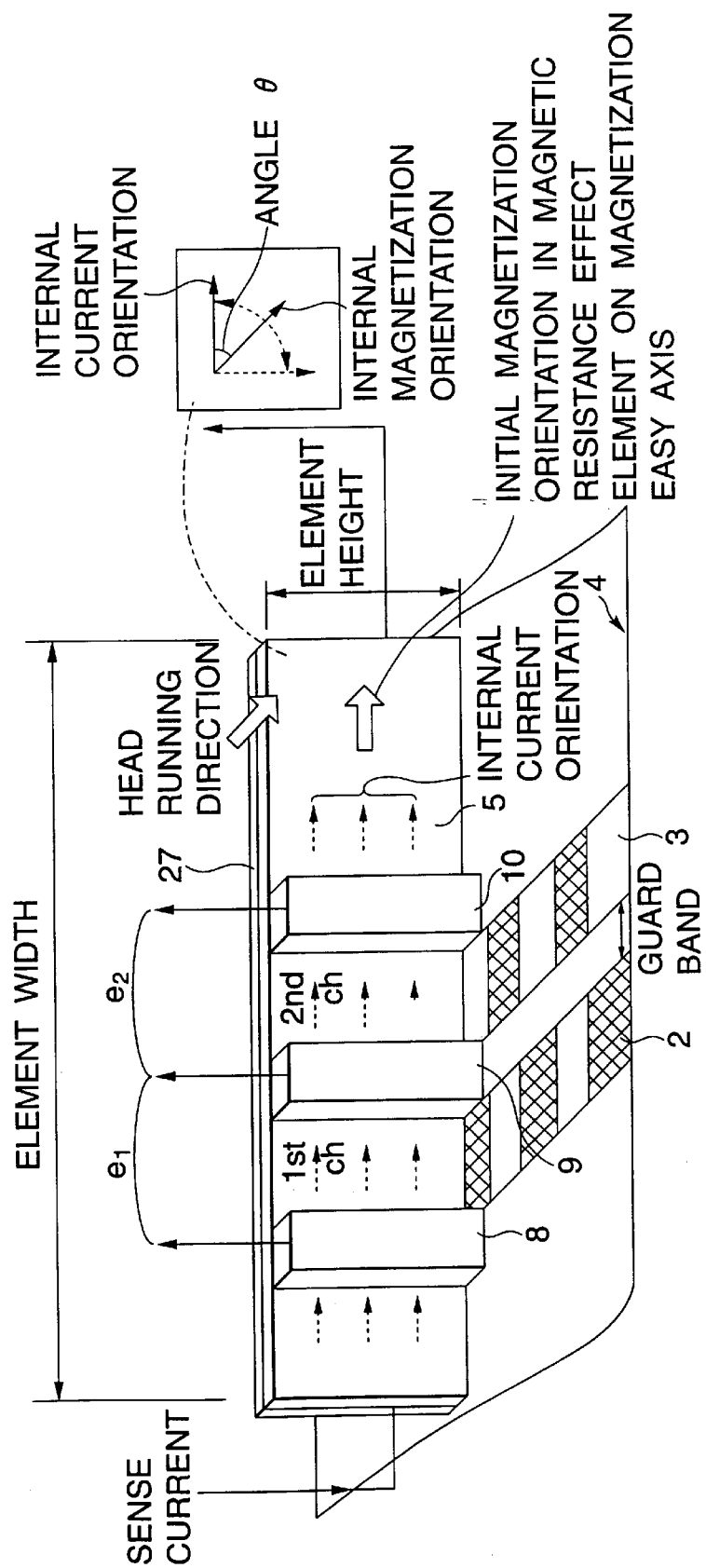
FIG. 12 is a diagram showing an arrangement of a conventional multi-channel MRE thin-film magnetic head.
Figure 13A:
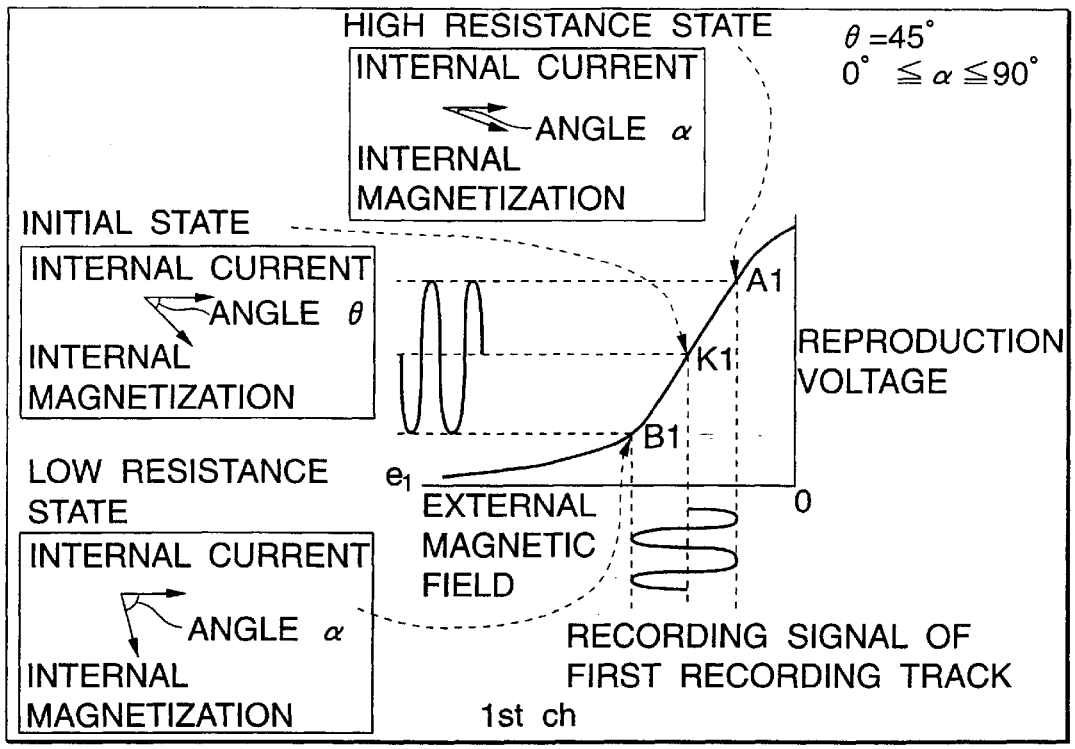
FIGS. 13A and 13B are diagrams showing how the FIG. 12 magnetic reproducing head produces a reproduced signal in connection with a recording signal in each recorded track.
Figure 13B:
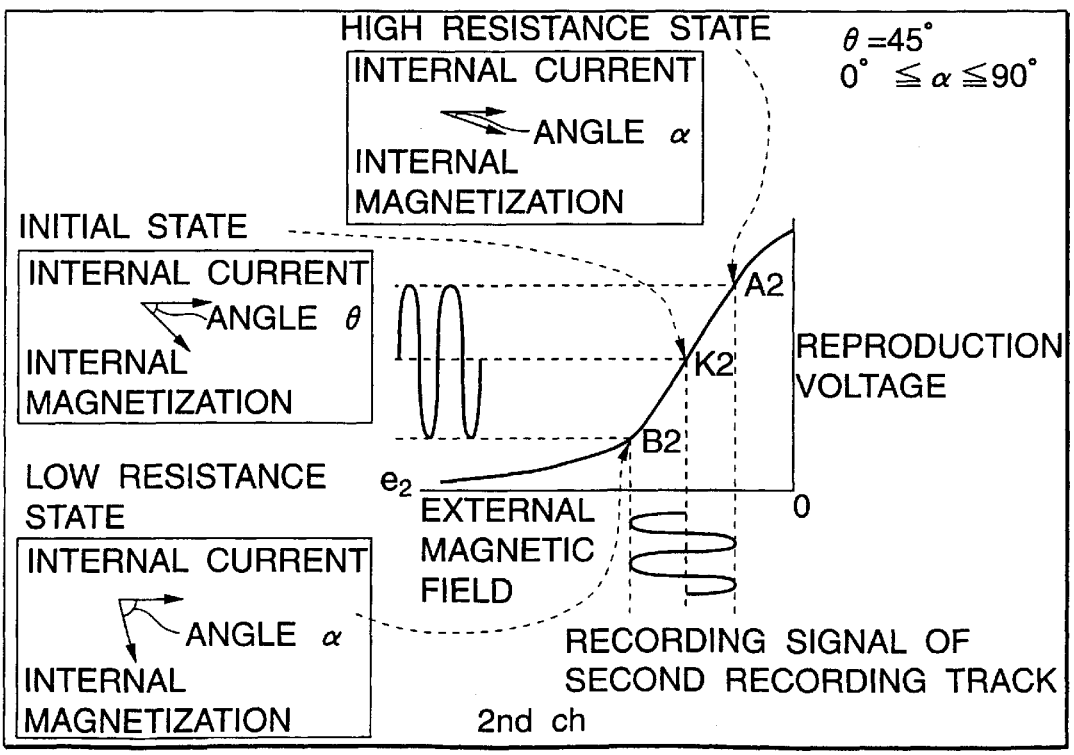
Figure 15:
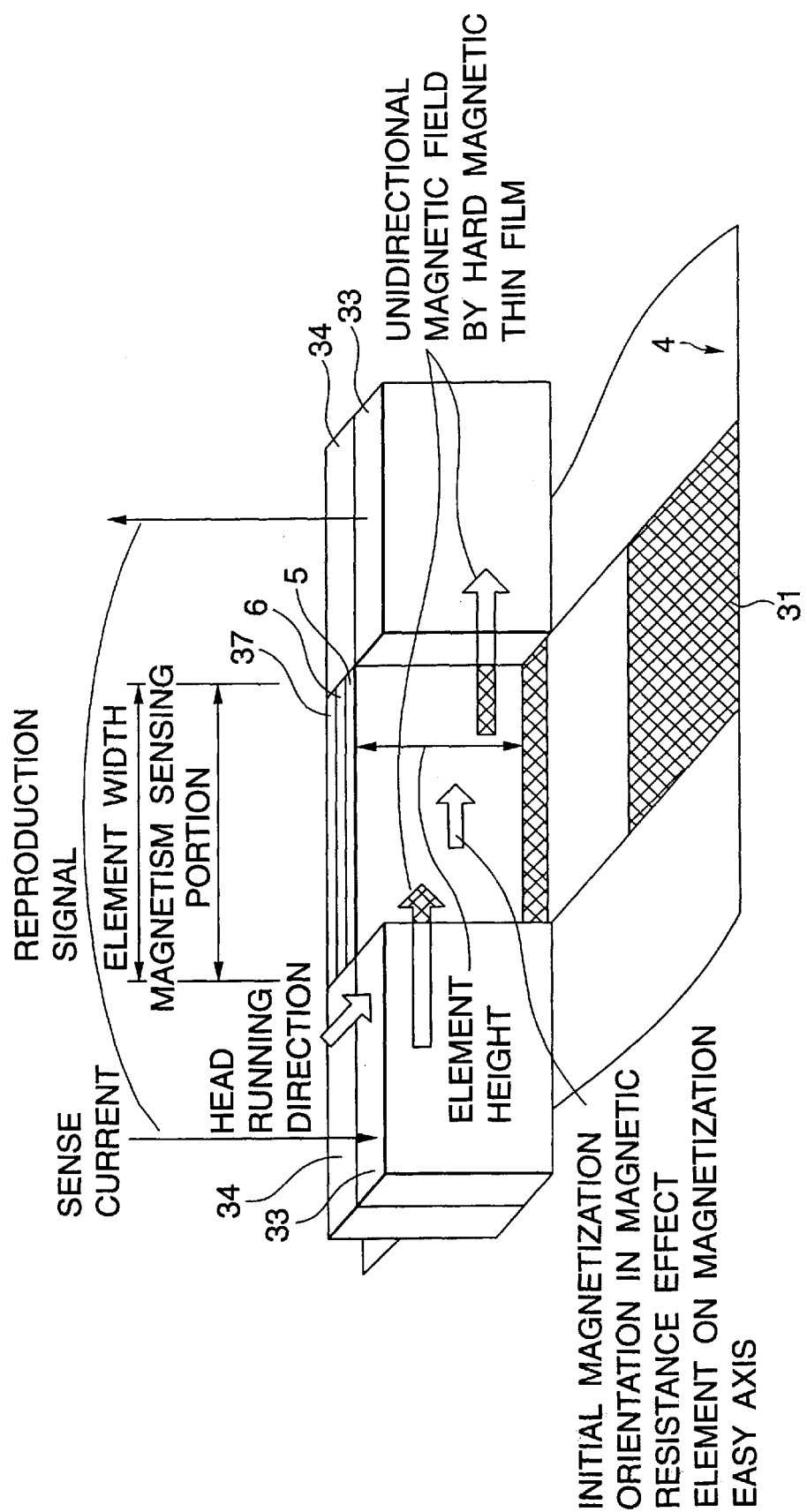
FIG. 15 is a diagram showing an arrangement of another conventional MRE thin film magnetic head for a single track reproduction.

The characteristic of the magnetic reproducing head of the present invention will be compared with that of the conventional multi-channel MRE thin-film magnetic head. A variation of a reproduction crosstalk quantity with respect to a magnitude of a unidirectional magnetic field by the domain control layer was measured for the magnetic reproducing head of the invention and the conventional multi-channel MRE thin-film magnetic head. The results of the measurement is as shown in FIG. 11. The multi-channel MRE thin-film magnetic head for high track density reproduction used in the measurement was the multi-channel MRE thin-film magnetic head not having the domain control layer, described in Japanese Patent Unexamined Publication No. Hei 8-263812.

The magnetic heads used for the FIG. 11 measurement were: 60 $\mu$m for the element width of the magnetoresistive effect element 5, 3 $\mu$m for the track pitch, 5 $\mu$m for the track width, and 5 for the number of channels. A crosstalk quantity on the ordinate is leaked from an adjacent channel (2nd channel) of the 3rd channel. The abscissa represents a magnitude of the unidirectional magnetic field. The multi-channel MRE thin-film magnetic head for high track density reproduction constructed according to the present invention improves over the conventional one 5 dB to 15 dB in reproduction crosstalk quantity.

In the conventional multi-channel MRE thin-film magnetic head, it is expected that, by using a single magnetoresistive-effect element, the magnetic domain of the magnetoresistive effect element is controlled by increasing a crystal magnetic anisotropy of the magnetoresistive effect element in a manner that the element width of the magnetoresistive effect element is set to be sufficiently larger than the element height. However, such a setting of the width to height ratio is insufficient to control the magnetic domain of the magnetoresistive effect element. Improper magnetic domains are formed or irregular magnetization occurs in the magnetoresistive effect element 5. As a result, Barkhausen noise is generated, and the reproduced signals of the recorded tracks are not uniform.

The above test showed that the magnetic reproducing head of the present invention is free from Barkhausen noises, and deformation of the reproduced signal waveforms. The same results shown in FIG. 11 were qualitatively confirmed for the remaining embodiments of the invention, the 2nd to 8th embodiments.

As seen from the foregoing description, in the multi-channel MRE thin-film magnetic head of the invention, a magnetic flux leaking from an adjacent recorded track is remarkably reduced. A magnetic field is applied to the magnetoresistive effect element by the domain control layer, so that the domain control of the magnetoresistive effect element is possible. This remarkably reduces the Barkhausen noises.

It is evident that the present invention is not limited to the 1st to 8th embodiments described above. The number of channels is two in those embodiments, but the present invention is operable if the number of channels is two or larger, as a matter of course.

Since the uniform magnetic field is applied to a region of the magnetoresistive effect element, the following useful effects are produced. A reproduction crosstalk from an adjacent recorded track is considerably reduced even when the track pitch is narrow. The domain control of the magnetoresistive effect element is efficiently carried out. Barkhausen noise is remarkably reduced.

Each domain control layer is an antiferromagnetic thin film or a hard magnetic thin film. With this, a unidirectional magnetic field is applied to a region of the magnetoresistive effect element by exchange bond at the interface between the magnetoresistive effect element and the domain control layer. The advantageous results are to considerably reduce the reproduction crosstalk from an adjacent recording medium, to efficiently control the magnetic domain of the magnetoresistive effect element, and to considerably reduce Barkhausen noises.

A nonmagnetic conductive layer is formed between a magnetoresistive effect element and each hard magnetic thin film. With this, conduction between each detecting electrode and the magnetoresistive effect element is secured, exchange interactive action between the magnetoresistive effect elements is prevented, a unidirectional magnetic field is applied to a region of the magnetoresistive effect element by a leaking magnetic field of the domain control layer. The results are to considerably reduce the reproduction crosstalk from an adjacent recording medium, to efficiently control the magnetic domain of the magnetoresistive effect element, and to considerably reduce Barkhausen noises.

A bias nonmagnetic conductive film is closely put on the other side of the magnetoresistive effect element. With this technical feature, an amplitude of a reproduced signal detected by a detecting electrode may be increased. A high reproduced signal is output even when the track pitch is narrow.

A nonmagnetic spacer layer and a bias thin film are closely put on the other side of the magnetoresistive effect element. With this technical feature, an amplitude of a reproduced signal detected by a detecting electrode may be increased. A high reproduced signal is output even when the track pitch is narrow.

Domain control layers bonded to the magnetoresistive effect element and detecting electrodes bonded to the surfaces of the domain control layers opposite to the magnetoresistive effect element are slanted at a predetermined angle on the bonding surface. Therefore, the effect yielded by the bias magnetic thin film is equivalently produced not using the bias magnetic thin film.

The magnetoresistive effect element consists of a spin bulb type magnetoresistive effect element. Because of this, an amplitude of the reproduced signal detected by the detecting electrode may be increased. Therefore, a high reproduced signal is output even when the track pitch is narrow.

What is claimed is:

1. A magnetic reproducing head, comprising:
   a magnetoresistive effect element disposed crossing at least two recorded tracks on a magnetic recording medium, said recorded tracks being subjected to concurrent reproduction process, said magnetoresistive effect element allowing a flow of an internal current in a direction which depends on a sense current fed thereto, and having an easy axis of magnetization longitudinally oriented;
   detecting electrodes of which the number is equal to the number of reproduced recorded tracks +1, said detecting electrodes being bonded on one of the large surfaces of said magnetoresistive effect element while vertically disposed between said recorded tracks; and
   domain control layers of which the number is equal to that of said detecting electrodes, said domain control layers being closely formed between said magnetoresistive effect element and said detecting electrodes, wherein said magnetoresistive effect element has an element width at least three times as large as an element height and each of said domain control layers has a width shorter than the width of a portion having no information recorded therein and being located between said recorded tracks, said domain control layers capable of generating a unidirectional magnetic field directed in an orientation of an initial magnetization in a single magnetoresistive effect element, the orientation of which depends on a direction of an easy axis for said magnetoresistive effect element.

2. The magnetic reproducing head as claimed in claim 1, wherein each of said domain control layers is an antiferromagnetic thin film or a hard magnetic thin film having an orientation of magnetization at the interface between said thin film and said magnetoresistive effect element, which is coincident with an orientation of an initial magnetization of a single magnetoresistive effect element on an easy axis of said magnetoresistive effect element.

3. The magnetic reproducing head as claimed in claim 1, wherein each of said domain control layers is a hard magnetic thin film having an orientation of magnetization displaced 180° from an orientation of an initial magnetization of a single magnetoresistive effect element on an easy axis of said magnetoresistive effect element, and a nonmagnetic conductive layer is formed between said magnetoresistive effect element and said hard magnetic thin film.

4. The magnetic reproducing head as claimed in claim 1, wherein a bias nonmagnetic conductive film is closely formed on the other side of said magnetoresistine effect element, said bias nonmagnetic conductive film developing a bias magnetic field directed upward or downward in the element height by flowing part of a sense current into said magnetoresistine effect element in its longitudinal direction so that an angle developed between an orientation of an internal magnetization and an orientation of an internal current of said magnetoresistine effect element is set at a given angle between a range of 10° to 80° or a range of 100° to 170°.

5. The magnetic reproducing head as claimed in claim 1, wherein a spacer layer is closely formed on the other side of said magnetoresistine effect element, and a bias conductive film is closely formed on said spacer layer while being disposed in opposition to said magnetoresistine effect element with respect to said spacer layer, said bias conductive film developing a bias magnetic field so that an angle developed between an orientation of an internal magnetization and an orientation of an internal current of said magnetoresistine effect element is set at a given angle between a range of 10° to 80° or a range of 100° to 170°.

6. The magnetic reproducing head as claimed in claim 5, wherein said bias conductive film is any of a soft magnetic thin film or a hard magnetic thin film magnetized in an upward or downward direction when viewed in the height of said magnetoresistine effect element, and said space layer is a nonmagnetic conductive film for developing a bias magnetic field directed upward or downward in the height of said magnetoresistive effect element by flowing a current in its longitudinal direction.

7. The magnetic reproducing head as claimed in claim 1, wherein said domain control layers bonded on said magnetoresistive effect element and said detecting electrodes bonded on the surfaces of said domain control layers opposed to said magnetoresistive effect element are slanted at a predetermined angle on the bonding surfaces so that an angle developed between an orientation of an internal magnetization and an orientation of an internal current of said magnetoresistive effect element is set at a given angle between a range of 10° to 80° or a range of 100° to 170°.

8. The magnetic reproducing head as claimed in claim 1, wherein said magnetoresistive effect element is a spin valve magnetoresistive effect element consisting of a lamination of an antiferromagnetic thin film, a first ferromagnetic thin film, and a second ferromagnetic thin film which are layered with a nonmagnetic conductive layer interposed therebetween, a magnetization of said first ferromagnetic thin film is fixedly oriented upward or downward in the height of said magnetoresistive effect element by said antiferromagnetic thin film, an orientation of magnetization of the said second ferromagnetic thin film of which an initial magnetization is set in the element widthwise direction is rotated in accordance with a magnitude of a leaking flux from said magnetic recording medium, and its resistance variation of it, which depends on a quantity of magnetization rotation, is converted into a voltage variation, and the voltage variation is output as an output signal from said magnetic recording medium.

* * * * *